United States Patent [19]
Lundberg et al.

[11] Patent Number: 4,971,711

[45] Date of Patent: Nov. 20, 1990

[54] LACTONE-MODIFIED, MANNICH BASE DISPERSANT ADDITIVES USEFUL IN OLEAGINOUS COMPOSITIONS

[75] Inventors: Robert D. Lundberg, Bridgewater; Antonio Gutierrez, Mercerville, both of N.J.

[73] Assignee: Exxon Chemical Patents, Inc., Linden, N.J.

[21] Appl. No.: 294,521

[22] Filed: Jan. 9, 1989

Related U.S. Application Data

[62] Division of Ser. No. 77,713, Jul. 24, 1987, Pat. No. 4,820,432.

[51] Int. Cl.[5] .......................................... C10M 159/16
[52] U.S. Cl. .................................. 252/49.6; 548/546; 548/547; 525/148; 525/163
[58] Field of Search ............... 252/49.6; 548/546, 547; 525/148, 163

[56] References Cited

U.S. PATENT DOCUMENTS

| | | | |
|---|---|---|---|
| Re. 26,330 | 1/1968 | Colfer | 208/48 |
| 2,890,208 | 6/1959 | Young | 260/78.3 |
| 3,087,936 | 4/1963 | LeSuer | 260/326.3 |
| 3,131,150 | 4/1964 | Stuart et al. | 252/34.7 |
| 3,154,560 | 10/1964 | Kirkwood | 260/326.3 |
| 3,169,945 | 2/1965 | Hostetettler et al. | 260/78.3 |
| 3,172,892 | 3/1965 | LeSuer et al. | 260/326.5 |
| 3,198,736 | 8/1965 | Henderson | 252/46.7 |
| 3,202,678 | 8/1965 | Stuart et al. | 260/326.5 |
| 3,215,707 | 11/1965 | Rease et al. | 260/326.3 |
| 3,219,666 | 11/1965 | Norman et al. | 260/268 |
| 3,231,587 | 11/1966 | Rease et al. | 260/346.8 |
| 3,269,946 | 8/1966 | Wiese | 252/32.5 |
| 3,272,743 | 9/1966 | LeSuer | 252/32.5 |
| 3,272,746 | 9/1966 | LeSuer | 252/47.5 |
| 3,278,550 | 10/1966 | LeSuer | 260/326.3 |
| 3,284,409 | 11/1966 | Dorer | 252/49.9 |
| 3,284,417 | 11/1966 | Hostettler et al. | 260/78.3 |
| 3,288,714 | 11/1966 | Osuch | 252/57 |
| 3,325,484 | 6/1967 | Deghenghi et al. | 260/239.55 |
| 3,361,673 | 1/1968 | Stuart et al. | 252/51.5 |
| 3,381,022 | 4/1968 | LeSuer | 260/404.8 |
| 3,390,086 | 6/1963 | Ohalloran | 252/47.5 |
| 3,401,118 | 9/1968 | Benoit et al. | 252/51.5 |
| 3,403,102 | 9/1968 | LeSuer | 252/49.8 |
| 3,442,808 | 5/1969 | Traise et al. | 252/49.6 |
| 3,455,827 | 7/1969 | Mehmedbasich et al. | 252/32.7 |
| 3,522,179 | 7/1970 | LeSuer | 252/51.5 |
| 3,562,159 | 2/1971 | Mastin | 252/32.7 |
| 3,576,743 | 4/1971 | Widmer et al. | 252/51.5 |
| 3,632,510 | 1/1972 | LeSuer | 252/35 |
| 3,649,229 | 3/1972 | Otto | 44/73 |
| 3,684,771 | 8/1972 | Braun | 260/77 |
| 3,792,061 | 2/1974 | Zecher et al. | 260/326 N |
| 3,798,165 | 3/1974 | Piasek et al. | 252/51.5 R |
| 3,799,877 | 3/1974 | Nnadi et al. | 252/51.5 R |
| 3,836,470 | 9/1974 | Miller | 252/51.5 A |
| 3,836,471 | 9/1974 | Miller | 252/51.5 A |
| 3,838,050 | 9/1974 | Miller | 252/40.5 |
| 3,838,052 | 9/1974 | Miller | 252/56 R |
| 3,879,308 | 4/1975 | Miller | 252/56 R |
| 3,912,764 | 10/1975 | Palmer | 260/346.8 |
| 3,927,041 | 12/1975 | Cengle et al. | 260/346.8 |
| 3,950,341 | 4/1976 | Okamoto et al. | 260/268 C |
| 4,062,786 | 12/1977 | Brois et al. | 252/51.5 R |
| 4,110,349 | 9/1978 | Cohen | 260/346.74 |
| 4,113,639 | 9/1978 | Lonstrup et al. | 252/51.5 A |
| 4,116,875 | 9/1978 | Nnadi et al. | 252/49.7 |
| 4,116,876 | 9/1978 | Brois et al. | 252/49.6 |
| 4,123,373 | 10/1978 | Brois et al. | 252/48.6 |
| 4,151,173 | 3/1979 | Vogel | 260/326.5 F |
| 4,195,976 | 4/1980 | Ryer et al. | 44/63 |
| 4,234,435 | 11/1980 | Meinhardt et al. | 252/51.5 A |
| 4,354,950 | 10/1982 | Hammons | 252/51.5 A |
| 4,362,635 | 12/1982 | Dhein et al. | 252/565 |
| 4,379,914 | 4/1983 | Lundberg | 528/354 |
| 4,388,471 | 6/1983 | Wollenberg | 549/255 |
| 4,450,281 | 5/1984 | Wollenberg | 549/255 |
| 4,463,168 | 7/1984 | Lundberg | 528/355 |
| 4,502,970 | 3/1985 | Schetelich et al. | 252/32.7 E |
| 4,517,104 | 5/1985 | Bloch et al. | 252/51.5 A |
| 4,532,058 | 7/1985 | Chafetz | 252/51.5 A |
| 4,536,547 | 8/1985 | Lundberg et al. | 525/186 |
| 4,584,117 | 4/1986 | Wollenberg | 252/51.5 A |
| 4,585,566 | 4/1986 | Wollenberg | 252/51.5 A |
| 4,612,132 | 9/1986 | Wollenberg et al. | 252/51.5 A |
| 4,614,603 | 9/1986 | Wollenberg | 252/51.5 A |
| 4,617,138 | 10/1986 | Wollenberg | 252/51.5 A |
| 4,624,681 | 11/1986 | Wollenberg | 44/63 |
| 4,645,515 | 2/1987 | Wollenberg | 44/63 |
| 4,647,390 | 3/1987 | Buckley et al. | 252/51.5 A |
| 4,663,062 | 5/1987 | Wollenberg | 252/47.5 |
| 4,666,459 | 5/1987 | Wollenberg | 44/56 |
| 4,666,460 | 5/1987 | Wollenberg | 44/63 |
| 4,668,246 | 5/1987 | Wollenberg | 44/63 |
| 4,680,129 | 7/1987 | Plavac | 252/51.5 A |
| 4,741,848 | 5/1988 | Koch et al. | 252/49.6 |
| 4,820,432 | 4/1989 | Lundberg et al. | 252/51.5 A |

FOREIGN PATENT DOCUMENTS 0612320 1/1961 Canada.
202024 11/1986 European Pat. Off..
1054370 1/1967 United Kingdom.

*Primary Examiner*—Olik Chaudhuri
*Assistant Examiner*—Jerry D. Johnson
*Attorney, Agent, or Firm*—J. B. Murray, Jr.

[57] ABSTRACT

Poly ($C_5$–$C_9$ lactone) modified Mannich base adducts are made by reacting a $C_5$–$C_9$ lactone, an amine, an aldehyde, an N-hydroxyarylamine, and a hydrocarbyl substituted $C_4$–$C_{10}$ monounsaturated dicarboxylic acid producing material, e.g., a polyisobutenyl, succinic anhydride, which, in turn, preferably is made by reacting a polymer of a $C_2$ to $C_{10}$ monoolefin, preferably polyisobutylene, having a molecular weight of about 700 to 10,000 with a $C_4$ to $C_{10}$ monounsaturated acid, anhydride or ester, preferably maleic anhydride, such that there are about 0.7 to 2.00 dicarboxylic acid producing moieties per molecule of said olefin polymer used in the reaction mixture. The resulting adducts are useful per se as oil soluble dispersant additives. They are also useful in fuel and lubricating oil compositions, as well as in concentrates and additive packages.

112 Claims, No Drawings

LACTONE-MODIFIED, MANNICH BASE DISPERSANT ADDITIVES USEFUL IN OLEAGINOUS COMPOSITIONS

This is a division of application Ser. No. 077,713, filed July 24, 1987, now U.S. Pat. No. 4,820,432.

RELATED U.S. APPLICATIONS

This application is related to the following applications filed by the inventors herein: Ser. No. 916,218, Ser. No. 916,114 now U.S. Pat. No. 4,866,139, Ser. No. 916,113 now U.S. Pat. No. 4,866,140, Ser. No. 916,287 now U.S. Pat. No. 4,866,135, Ser. No. 916,108 now U.S. Pat. No. 4,906,394, Ser. No. 916,303 now U.S. Pat. No. 4,866,142 and Ser. No. 916,217 now U.S. Pat. No. 4,866,141, all of which applications were filed on Oct. 7, 1986. This application is also related to Ser. No. 77,716, filed on July 24, 1977 by the inventors herein, now U.S. Pat. No. 4,828,742, and to a divisional thereof, Ser. No. 294,459, filed Jan. 9, 1989 now U.S. Pat. No. 4,913,830.

BACKGROUND OF THE INVENTION

1. Field of the Invention

This invention relates to oil soluble dispersant additives useful in fuel and lubricating oil compositions, including concentrates containing said additives, and methods for their manufacture and use. The dispersant additives are poly ($C_5$–$C_9$ lactone) modified Mannich base adducts which are prepared from moieties of N-hydroxyaryl amine, di- or polyamine, high molecular weight hydrocarbylsubstituted dicarboxylic acid material, aldehyde and $C_5$–$C_9$ lactone. The high molecular weight hydrocarbon group has a number average molecular weight ($\overline{M}_n$) of about 700 to about 10,000. The additives will have a ratio (functionality) of about 0.70 to about 2.0 dicarboxylic acid producing moieties for each equivalent weight of the high molecular weight hydrocarbon therein.

2. Prior Art

It is known that polymers of 6 t 10 membered lactones such as valerolactone or epsiloncaprolactone, hereinafter E-caprolactone, can be prepared by reacting the lactone monomer with a hydroxyl or amine initiator. When reacting E-caprolactone, for example, the polymerization reaction may be illustrated by the following equations:

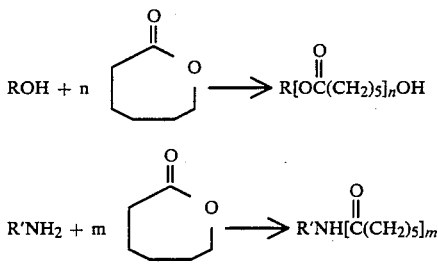

EQ. 1

EQ. 2

The reactions are known to be catalyzed by various esterification catalysts such as stannous octanoate, and a variety of different molecular weight products are feasible depending upon the ratio of lactone to initiator. Molecular weights on the order of from a few hundred up to about 5,000 are reproducably achievable.

Caprolactone can also be polymerized to a very high molecular weight, e.g., on the order of 100,000 or more. Typically such high molecular weight polymers do not employ initiators and preservation of functionality is not a requirement.

It is also known to react a lactone such as E-caprolactone with a diamine wherein one of the diamine groups is a tertiary amine and the other amine group is a primary or secondary amine to form a polycaprolactone polymer having a tertiary amine group at one end and a primary hydroxyl group at the other end. The polycaprolactone polymer would be used to neutralize polymeric acids.

U.S. Pat. No. 4,354,950 discloses a method of preparing Mannich base derivatives of hydroxyaryl succinimides of the formula

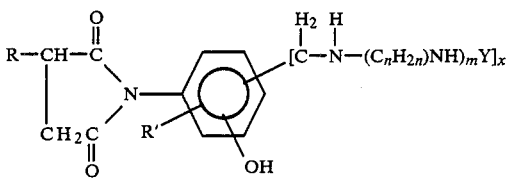

wherein R is hydrocarbyl of 25 to 200 carbons, R' is H, alkyl or halogen, "n" is 2 or 3, "m" has a value of 1 to 5, Y is H or a methylene hydroxyaryl succinimide radical, "x" has a value of 1 to 2 when Y is H and a value of 1 when Y is a methylene hdyroxyarl succinimide radical. The above succinimides are formed in a stepwise reaction, e.g., by reacting a polyalkenyl succinic anhydride with an aminophenol, to produce an intermediate N-(hydroxyaryl) hydrocarbyl succinimide, which is then reacted with an alkylene diamine or polyalkylene polyamine and an aldehyde (e.g., formaldehyde) in a Mannich base reaction to produce the described succinimides. The described succinimides may be added to a base oil of lubricating viscosity to form lubricant concentrates and lubricating oil formulations.

It has now been found that oil soluble dispersant additives, useful in fuel and lubricating oil compositions, including concentrates containing the additives, can be prepared by polymerizing a 6 to 10 membered lactone using as the initiator those lactone-reactive functions contained within the class of oil soluble Mannich base derivatives disclosed, for example, in U.S. Pat. No. 4,354,950.

While there are a number of prior art disclosures relating to Mannich base dispersants and to lactone polymerization reactions, in general, little or no prior art of direct pertinence appears to have surfaced in regard to the present dispersants. Exemplary of the patent literature which relates to lactone polymerization processes and/or to oil soluble dispersant additives are the following U.S. Patents: U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycolaliphatic or aromatic carboxylic acids, and lactones of aliphatic $C_5$–$C_{12}$ hydroxycarboxylic acids. The synthetic ester oils are suitable for the preparation of lubricants and lubricant compositions.

U.S. Pat. No. 3,202,678 discloses as oil additives, N-polyamine substituted alkenyl succinimides, wherein the alkenyl radical is obtained by polymerizing a $C_2$–$C_5$ olefin to form a hydrocarbon having a molecular weight ranging from about 400 to about 3000. The number of dicarboxylic acid producing moieties per hydrocarbon radical in the succinimides is not disclosed, but the mole ratio of polyolefin to maleic anhydride used to obtain the alkenyl succinimides is from 1:1 to 1:10.

U.S. Pat. No. 3,219,666 discloses as dispersing agents in lubricants, derivatives of polyalkenyl succinic acids and nitrogen compounds, including polyamines. The preferred molecular weight of the polyalkenyl moieties is 750–5,000.

U.S. Pat. No. 4,234,435 discloses as oil additives, polyalkylene substituted dicarboxylic acids derived from polyalkylenes having a $\overline{M}_n$ of 1300 to 5,000 and containing at least 1.3 dicarboxylic acid groups per polyalkylene. In Example 34 of that patent, a polyisobutene-substituted succinic acylating agent is reacted with caprolactam in the presence of mineral oil and sodium hydroxide.

U.S. Pat. No. 3,381,022 relates to ester derivatives of substantially saturated polymerized olefin-substituted succinic acid wherein the polymerized olefin substituent contains at least about 50 aliphatic carbon atoms and as a molecular weight of about 700 to 5000. The esters include the acidic esters, diesters, and metal salt esters wherein the ester moiety is derived from monohydric and polyhydric alcohols, phenols and naphthols. The ester derivatives are useful as additives in lubricating compositions, fuels, hydrocarbon oils and power transmission fluids. A related application, i.e., U.S. Pat. No. 3,522,179, relates to lubricating compositions comprising a major amount of a lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrocarbon substituent may be derived from a polymerized lower monoolefin having a molecular weight of from about 700 to about 5,000.

U.S. Pat. No. 4,502,970 discloses lubricating oil compositions useful in both gasoline engines and diesel engines. The compositions contain a polyisobutenyl succinicimide as a supplemental dispersant-detergent in combination with another conventional dispersant. The polyisobutenyl group has a $\overline{M}_n$ of about 700–5,000.

U.S. Pat. No. 4,379,914 and its continuation-in-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized sulfonated derivatives.

U.S. Pat. No. 3,169,945 discloses the preparation of lactone polyesters which are useful as plasticizers and as intermediates for preparing elastomers and foams. The polyesters can be prepared by reacting a lactone such as E-caprolactone with an initiator such as an alcohol, amine or amino alcohol.

U.S. Pat. No. 4,532,058 discloses as a motor oil dispersant, a spirolactone condensation product formed by heating alkenyl succinic anhydrides in the presence of a basic catalyst, and then heating the resulting bicyclic spirodilactone condensation product with a polyamine or polyamine alcohol. It should be emphasized that this patent describes the intermolecular decaboxylation of an alkenyl succinic anhydride at elevated temperatures to form a condensation product and carbon dioxide as a byproduct. This prior art is not concerned with polymerizable lactones which are the subject of the instant invention.

U.S. Pat. Nos. 4,113,639 and 4,116,876 disclose an example of alkenyl succinic anhydride having a molecular weight of the alkenyl group of 1,300 and a Saponification Number of 103 (about 1.3 succinic anhydride units per hydrocarbon molecule). This alkenyl succinic anhydride may be reacted with polyamine and then boric acid (U.S. Pat. No. 4,113,639), or may be reacted with an amino alcohol to form an oxazoline (No. 4,116,876) which is then borated by reaction with boric acid.

U.S. Pat. No. 4,062,786 in Example 13 shows a polyisobutenylsuccinic anhydride of molecular weight of about 1300 and Saponification Number of about 100 (about 1.25 succinic anhydride units per alkenyl group).

U.S. Pat. No. 4,123,373 in Example 3 shows a polyisobutenylsuccinic anhydride of about 1,400 molecular weight having a Saponification Number of 80 (about 1.07 succinic anhydride units per polyisobutylene units).

U.S. Pat. No. 3,442,808 relates to lubricating oil additives prepared by reacting alkenyl succinic anhydride with the Mannich condensation product prepared by condensing alkyl substituted phenol, formaldehyde and polyalkylene polymaine.

U.S. Pat. No. 3,649,229 relates to reaction products obtained from high molecular weight alkylsubstituted hydroxy aromatic compounds, amines and aldehydes, which are disclosed to be useful as detergency improvers for liquid hydrocarbon fuels.

U.S. Pat. No. 3,798,165 relates to oil soluble high molecular weight Mannich condensation products formed by reacting certain high molecular weight alkyl-substituted hydroxy aromatic compounds, with a compound containing at least a $HN<$ group (e.g., an alkylene polyamine) and an aldehyde (e.g., formaldehyde).

U.S. Pat. No. 4,388,471 discloses a process for preparing substituted carboxylic acids and their derivatives succinic anhydride in which the synthesis reaction is carried out at least partially thermally in the presence of a furan-type compound. A similar process is disclosed in U.S. Pat. No. 4,450,281 wherein an alkenylsuccinic anhydride is made from a hydrocarbon with at least two double bonds, such as an ethylene-propylene-butadiene terpolymer. The products of these patents are useful as viscosity index improvers.

U.S. Pat. No. 4,584,117 and its division (U.S. Pat. No. 4,624,681) disclose additives which are useful as dispersants in lubricating oils, gasolines, marine crankcase oils and hydraulic fluids. The additives are prepared by first reacting a polyamine with a cyclic carbonate to form an intermediate, followed by reaction of this intermediate with an alkenyl or alkyl succinic anhydride.

U.S. Pat. No. 4,585,566 relates to nitrogen-containing dispersant additives having at least one primary or secondary amine group which have been modified by treatment with a cyclic carbonate. Examples of the nitrogen-containing dispersants which are so modified include polyoxyalkylene polyamines, Mannich bases, borated Mannich bases and hydrocarbyl sulfonamides having at least one additional amino group.

U.S. Pat. No. 4,612,132 related additives which are useful as dispersants and lubricating oils, gasolines and the like. The additives polyamino alkenyl or alkyl succinimides which have been reacted with cyclic carbonates, linear mono- or polycarbonates, or chloroformate to introduce carbonate functionality.

U.S. Pat. No. 4,614,603 is directed to polyamino alkenyl or alkyl succinimides which have been modified by treatment with a thiolactam, lactam or thiolactone. The modified materials are useful as dispersants or detergents in lubricating oils.

U.S. Pat. No. 4,617,138 relates to polyamino alkenyl or alkyl succinimides which have been modified by treatment with a lactone to yield modified succinimides with a hydrocarbylcarbonylalkylene group. The modified succinimides are useful as dispersants in lubricating oils, gasolines, marine crankcase oils and hydraulic oils. The lactones which are disclosed as being suitable for treating the succinimides are limited to 2-hydrocarbylcarbonyl substituted lactones which may be prepared, for example, by reacting an ester and a lactone, such as gamma butyrolactone or valerolactone in the presence of an organic or inorganic base.

European Pat. No. 202,024 relates to additives which are useful as dispersants in lubricating oils and hydrocarbon fuels and which are obtained by treating polyamino alkenyl or alkyl succinimides with a cyclic carbonate, thiocarbomate, or dithiocarbomate.

U.S. Pat. No. 4,645,515 discloses polyamine alkenyl or alkyl succinimides which have been modified by treatment with a lactone to yield polyamino alkenyl or alkyl succinimides wherein one or more of the basic nitrogens of the polyamino moiety is substituted with a hydroxyalkylene carbonyl group. The additives so disclosed are useful as dispersants in lubricating oils, gasolines, marine crank case oils and hydraulic oils.

U.S. Pat. No. 4,647,390 relates to additives which are useful as dispersants and detergents in lubricating oils and fuels. The additives are polyamino alkenyl or alkyl succinimides wherein one or more of the amino nitrogens of the succinimide is substituted with

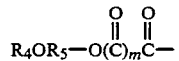

wherein $R_4$ is hydrocarbyl of from 1 to 30 carbon atoms; $R_5$ is hydrocarbyl of from 2 to 30 carbon atoms or $-R_6-(OR_6)_p-$, wherein $R_6$ is alkylene of 2 to 5 carbon atoms and p is an integer from 1 to 100; and m is an integer of from 0 to 1.

U.S. Pat. No. 4,663,062 discloses polyaminoalkenyl or alkyl succinimides which have been modified by treatment with a compound of the formula:

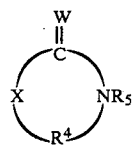

wherein W is oxygen or sulfur; X is oxygen or sulfur; $R_4$ is an alkylene group of from 2 to 3 carbon atoms or an alkylene group of from 2 to 3 carbon atoms substituted with from 1 to 3 alkyl groups of from 1 to 2 carbon atoms each; and $R_5$ is hydrogen or alkyl of from 1 to 20 carbon atoms. The modified polyamino alkenyl or alkyl succinimides possess dispersancy and detergency in lubricating oils and in fuels. Similar disclosures are contained in U.S. Pat. Nos. 4,666,459 and 4,666,460.

U.S. Pat. No. 4,668,246 relates to polyamino alkenyl or alkyl succinimides which have been modified by treatment with a lactone to yield polyamino alkenyl or alkyl succinimides wherein one or more of the basic nitrogens of the polyamino moiety is substituted with a hydrocarbylcarbonylalkylene group. The additives are useful as dispersants in lubricating oils, gasolines, marine crank case oils and hydraulic oils.

Additional exemplary prior art disclosures which are expressly incorporated herein by reference in their entirely are U.S. Pat. Nos.: 2,890,208; 3,087,936; 3,131,150; 3,154,560; 3,172,892; 3,198,736; 3,215,707; 3,231,587; 3,325,484; 3,269,946; 3,272,743; 3,272,746; 3,278,550; 3,284,409; 3,284,417; 3,288,714; 3,361,673; 3,390,086; 3,401,118; 3,403,102; 3,455,827; 3,562,159; 3,576,743; 3,632,510; 3,684,771; 3,792,061; 3,799,877; 3,836,470; 3,836,471; 3,838,050; 3,838,052; 3,879,308; 3,912,764; 3,927,041; 3,950,341; 4,110,349; 4,116,875; 4,151,173; 4,195,976; 4,517,104; 4,536,547 and Re. No. 26,330.

SUMMARY OF THE INVENTION

It is a principal object of this invention to provide a novel class of poly ($C_5$–$C_9$ lactone) adduct dispersants.

Another object is to provide a process for preparing a novel class of dispersants from $C_5$–$C_9$ lactones and Mannich base derivatives of N-(hydroxyaryl) hydrocarbyl-substituted imides which contain lactone-reactive amine functionality.

Another object is to provide a process for preparing novel classes of polymeric dispersants from $C_5$–$C_9$ lactones, hydroxyaryl amines, long chain hydrocarbyl-substituted dicarboxylic acid producing materials di- or polyamines, and aldehydes. Yet another object is to provide a process for preparing novel polymeric dispersants from $C_5$–$C_9$ lactones and the reaction product of a hydrocarbylsubstituted dicarboxylic acid material and a hydroxyaryl amine which has been further reacted with an amine and an aldehyde.

Still another object is to prepare novel polymeric dispersants by reacting a $C_5$–$C_9$ lactone with the reaction product of a hydrocarbyl-substituted dicarboxylic acid material and an N-hydroxyaryl amine, followed by reaction with an amine and an aldehyde.

Yet another object is to prepare poly($C_5$–$C_9$ lactone) modified Mannich base adduct dispersants by reacting a $C_5$–$C_9$ lactone with the reaction product of a hydroxyaryl amine, an amine and an aldehyde, followed by reaction with a hydrocarbyl-substituted dicarboxylic acid material.

Another object is to provide a process for preparing novel poly($C_5$–$C_9$ lactone) modified Mannich base adduct dispersants by reacting an amine with a $C_5$–$C_9$ lactone to form an intermediate which is further reacted, in sequence, with an aldehyde, a hydroxyaryl amine, and a hydrocarbyl-substituted dicarboxylic acid material.

Another object is to provide a process for preparing novel polymers dispersants by simultaneously reacting an amine, a $C_5$–$C_9$ lactone and an aldehyde to form an intermediate adduct, followed by the sequential reaction of the intermediate adduct with a hydroxyaryl amine and a hydrocarbylsubstituted dicarboxylic acid material.

A further object is to prepare novel poly ($C_5$–$C_9$ lactone) adduct dispersants by simultaneously reacting an amine, a $C_5$–$C_9$ lactone, a hydroxyaryl amine and an aldehyde to form an intermediate product, followed by reaction of the intermediate product with a hydrocarbyl-substituted dicarboxylic acid material.

A further object is to provide lubricant compositions and concentrates containing the novel poly (C$_5$–C$_9$ lactone) modified Mannich base adducts of this invention.

Yet another object is to provide a novel class of oil soluble polylactone modified Mannich base dispersants from polyalkylene substituted acylating agents which have at least one lactone-reactive amino group in their structure.

Still another object is to provide poly (C$_5$–C$_9$ lactone) adducts from Mannich base derivatives of polyalkylene substituted N-hydroxyaryl succinimides which contain at least one lactone-reactive amino group, as well as lubricant compositions and concentrates containing such adducts.

Still another object is to provide metal complexes and other post-treated derivatives, e.g., borated derivatives, of the novel poly(C$_5$–C$_9$ lactone) modified Mannich base adducts of this invention, as well as lubricant compositions and concentrates containing such post-treated derivatives.

The manner in which these and other objects can be achieved will be apparent from the detailed description of the invention which appears hereinbelow.

In one aspect of this invention, one or more of the above objects can be achieved by initiating the polymerization of a C$_5$–C$_9$ lactone by means of an amino function contained in a Mannich base derivative of a polyolefin substituted N-hydroxyaryl imide, wherein the polyolefin has a number average molecular weight of about 300 to about 10,000, wherein a polyolefin substituted dicarboxylic acid acylatin agent has been neutralized with an amino phenol, and wherein the polyolefin substituted, neutralized acylating agent contains from about 0.70 to about 2.0 dicarboxylic acid producing moieties, preferably acid anhydride moieties, per equivalent weight of polyolefin.

In another aspect, one or more of the objects of this invention can be achieved by heating a C$_5$–C$_9$ lactone such as E-caprolactone at a temperature of at least about 80° C., and preferably from about 90° C., to about 180° C. with a Mannich base derivative of a N-hydroxyaryl polyalkylene succinimide initator wherein the polyalkylene is characterized by a number average molecular weight of about 300–10,000 and wherein the initiator is characterized by the presence within its structure of from about 0.70 to about 2.0 succinic acid or succinic acid derivative moieties for each equivalent weight of polyalkylene; and, in a further aspect, one or more objects of this invention are achieved by providing poly (C$_5$–C$_9$ lactone) adducts produced by such a process.

One or more additional objects of this invention are achieved by reacting E-caprolactone with a polyalkylene succinic acylating agent which has been post-treated with a hydroxyaryl amine, a polyamine and an aldehyde to introduce into the structure thereof at least one lactone-reactive amino group; one or more additional objects are accomplished by providing poly (E-caprolactone) adducts produced by such a process One or more objects of this invention can be illustrated in connection with the reaction between E-caprolactone and a Mannich base derivative of a N-hydroxyaryl polyisobutenyl succinimide initiator having available primary amine functionality as follows:

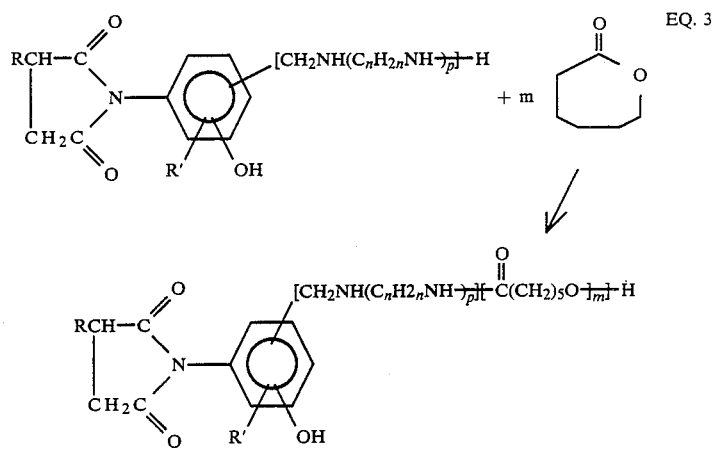

where n is a number from 1 to 4, p is a number from 1 to 7, m has an average value of about 0.2 to about 100, preferably from 1 to about 20, most preferably from 1 to about 5, R' is hydrogen, an alkyl radical or a halogen radical, R represents polyisobutylene having a number average molecular weight of from about 70 0 to about 5,000, and the ratio (functionality) of succinic acid producing moieties is from about 0.70 to about 2.0 per equivalent weight of polyisobutylene. The above polymerization can be conducted with or without a catalyst. However, it is generally preferred to employ a catalyst such as stannous octanoate in an amount of from about 100 to about 10,000 parts by weight of catalyst per one million parts of E-caprolactone.

One or more additional objects can be illustrated in connection with the reaction between E-caprolactone and a Mannich base derivative of a N-hydroxyaryl polyalkylene succinimide initiator having secondary amine functionality, such as a polyisobutenyl bis-succinimide, as follows:

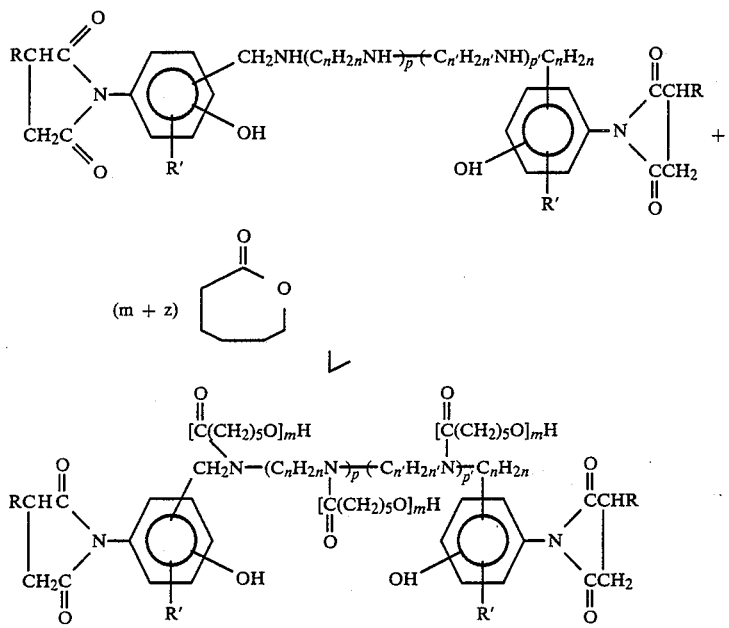

(EQ. 4)

where n, and n', independently, are numbers from 1 to 4; p and p', independently, are numbers from 1 to 7; and m and z, independently, have a value of zero to about 100, preferably from 1 to about 20, most preferably from 1 to about 5, provided however that both m and z can not be zero, R' represents H, a $C_1$ to C alkyl radical or a halogen radical (e.g., Cl-, Br- or I-), R represents polyisobutylne having a number average molecular weight of from about 700 to about 5,000, and the functionality of succinic acid producing moieties is from about 0.7 to about 2.0 per equivalent weight of polyisobutylene.

The novel poly ($C_5$–$C_9$ lactone) modified Mannich base adducts of this invention are useful per se as an additive, e.g. a dispersant additive, for example in the same manner as disclosed in U.S. Pat. No. 3,219,666 where prior art derivatives of polyalkenyl succinic acids and nitrogen compounds are used as dispersant/detergents in lubricants, especially lubricants intended for use in the crankcase of internal conbustion engines, gears, and power transmitting units. Accordingly, one or more objects of the invention are achieved by providing lubricating oil compositions, e.g. automatic transmission fluids, heavy duty oils suitable for use in the crankcases of gasoline and diesel engines, etc. containing the novel poly ($C_5$–$C_9$ lactone) adducts of this invention. Such lubricating oil compositions may contain additional additives such as viscosity index improvers, antioxidants, corrosion inhibitors, detergents, pour point depressants, antiwear agents, etc.

Still further objects are achieved by providing concentrate compositions comprising from about 10 to about 80 wt. % of a normally liquid, substantially inert, organic solvent/diluent, e.g. mineral lubricating oil, or other suitable solvent/diluent and from about 20 to about 90 wt. % of a poly ($C_5$–$C_9$ lactone) adduct, as mentioned above and described in more detail hereinafter.

DESCRIPTION OF THE PREFERRED EMBODIMENTS

The Hydrocarbyl Dicarboxylic Acid Material

The long chain hydrocarbyl substituted dicarboxylic acid material, i.e. acid or anhydride, or ester, used in the invention includes a long chain hydrocarbon, generally a polyolefin, substituted with 0.7 to 2.0, preferably 1.00 to 1.5, e.g. 1.05 to 1.3 moles, per mole of polyolefin of an alpha or beta unsaturated $C_4$ to $C_{10}$ dicarboxylic acid, or anhydride or ester thereof, such as fumaric acid, itaconic acid, maleic acid, maleic anhydride, chloromaleic acid, dimethyl fumarate, chloromaleic anhydride, etc.

Preferred olefin polymers for reaction with the unsaturated dicarboxylic acid material are polymers comprising a major molar amount of $C_2$ to $C_{10}$, e.g. $C_2$ to $C_5$ monoolefin. Such olefins include ethylene, propylene, butylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., a copolymer of isobutylene and butadiene; or a copolymer of ethylene, propylene and 1,4-hexadiene; etc.

In some cases, the olefin polymer may be completely saturated, for example an ethylenepropylene copolymer made by a Ziegler-Natta synthesis using hydrogen as a moderator to control molecular weight.

The olefin polymers will usually have a number average molecular weight ($\overline{M}_n$) within the range of about 700 and about 10,000, more usually between about 700 and about 5,000. Particularly useful olefin polymers have a number average molecular weight within the range of about 700 to about 3000, and more preferably within the range of about 900 to about 2,500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the olefin polymer with the $C_4$–$C_{10}$ unsaturated dicarboxylic acid material are known in the art. For example, the olefin polymer and the dicarboxylic acid material simply may be heated together as disclosed in U.S. Pat. Nos. 3,361,673 and 3,401,118 to cause a thermal "ene" reaction to take place; or, the olefin polymer can be first halogenated, for example, chlorinated or brominated to about 1 to 8, preferably 3 to 7 wt. % chlorine or bromine, based on the weight of polymer, by passing the chlorine or bromine through the polyolefin at a temperature of 100° to 250° C., e.g. 140° to 225° C. for about 0.5 to 10 preferably 1 to 7 hours. The halogenated polymer may then be reacted with sufficient unsaturated acid or anhydride at 100° to 250° C., usually about 140° to 180° C. for about 0.5 to 10, e.g. 3 to 8 hours, so the product obtained will contain about 1.0 to 1.5, preferably 1.06 to 1.20, e.g. 1.10 moles of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material may be mixed and heated while adding chlorine to the hot material. Processes of this type are disclosed in U.S. Pat. Nos. 3,215,707; 3,231,587; 3,912,764; 4,110,349; 4,234,435; and in U.K. No. 1,440,219.

By the use of halogen, about 65 to 95 wt. % of the polyolefin, e.g. polyisobutylene normally will react with the dicarboxylic acid material. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of dicarboxylic acid producing units to polyolefin o 0.70 to 2.0, 1.00 to 1.5 and 1.05 to 1.3 are based upon the total amount of polyolefin, that is the total of both the reacted and unreacted polyolefin, used to make the product.

The preferred long chain, hydrocarbyl substituted dicarboxylic anhydrides to be used in this invention can be illustrated by the formula:

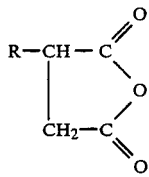

II wherein R is hydrocarbyl of from 50 to 300 carbon atoms, and preferably is a polyolefin derived from a $C_2$ to $C_{10}$ (e.g., $C_2$ to $C_5$) mono-alpha-olefin.

The Hydroxyaryl Amine Material

The hydroxyaryl amines which are useful in this invention comprise N-hydroxyaryl amines of the formula $H_2N$—Ar—OH    III wherein Ar represents

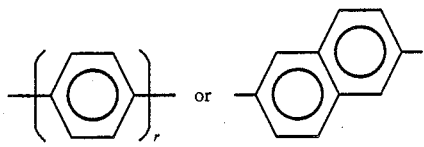

and wherein r is 1 or 2. Illustrative of such Ar groups are

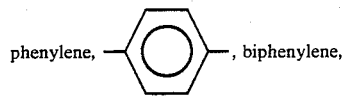
phenylene, biphenylene,

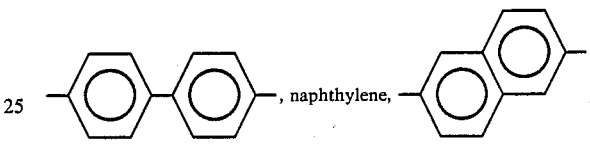
, naphthylene, and the like. The Ar group may be substituted with hydrocarbyl groups, e.g., alkyl groups containing 1 to 20 carbon atoms, or with 1 to 3 halogen radicals, e.g., chloro-, bromo-, or iodo-.

Preferred N-hydroxyaryl amine reactants are amino phenols of the formula:

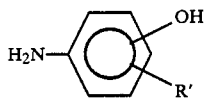

IV in which R' is hydrogen, an alkyl radical having from 1 to 3 carbon atoms or a halogen radical such as the chloride or bromide radical.

Suitable aminophenols include 2-aminophenol, 3-aminophenol, 4-aminophenol, 4-amino-3-methylphenol, 4-amino-3-chlorophenol, 4-amino-2-bromophenol and 4-amino-3-ethylphenol.

Suitable amino-substituted polyhydroxyaryls are the aminocatechols, the amino resorcinols, and the aminohydroquinones, e.g., 4-amino-1,2-dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene and the like.

Suitable aminoaphthols include 1-amino-5-hydroxynaphthalene, 1-amino-3-hydroxynaphthalene and the like.

The Amine Material

The amines which are useful in the present invention are those which can be reacted simultaneously with an aldehyde, such as formaldehyde, in the Mannich base reaction.

Useful amine compounds in the Mannich base reaction include polyamines of about 2 to 60, e.g., 3 to 20, most preferably 3 to 10, total carbon atoms in the molecule. These amines may be hydrocarbyl amines or may be hydrocarbyl amines including other noninterfering groups, e.g., alkoxy groups, amide groups, nitrile groups, imidazoline groups, and the like. Preferred amines are aliphatic saturated amines, including those of the general formula:

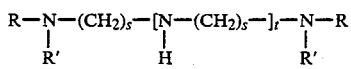   V wherein R and R' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; and $C_1$ to $C_{12}$ alkylamino $C_2$ to $C_6$ alkylene radicals; each s is the same or a different number of from 2 to 6, preferably 2 to 4; and t is a number of from 0 to 10, preferably 2 to 7. If t=0, then at least one of R or $R^1$ must be H such that there are at least two of either primary or secondary amino groups.

Non-limiting examples of suitable amine compounds include: 1,2-diaminoethane; 1,3-diaminopropane; 1,4-diaminobutane ; 1,6-diaminohexane; polyethylene amines such as diethylene triamine; triethylene tetramine; tetraethylene pentamine; polypropylene amines such as 1,2-propylene diamine; di-(1,2-propylene) triamine; di-(1,3-propylene) triamine; N,N-dimethyl-,1,3-diaminopropane; N,N-di-(2-aminoethyl) ethylene diamine; N-dodecyl-1,3-propane diamine; di-, and tri-tallow amines; amino morpholines such as N-(3-aminoproply) morpholine; etc.

Other useful amine compounds include: alicylic diamines such as 1,4-di(aminomethyl) cyclohexane, and heterocyclic compounds such as morpholines, imidazolines, and N-aminolakyl piperazines of the general formula:

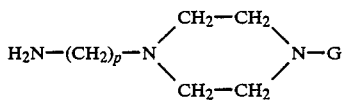   VI wherein G is independently selected from the group consisting of hydrogen and omega-( nontertiary)aminoalkylene radicals of from 1 to 3 carbon atoms, and p is a number of from 1 to 4. Nonlimiting examples of such amines include 2-pentadecyl imidazoline; N-(2-aminoethyl) piperazine; etc.

Commercial mixtures of amine compounds advantageously may be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. A low cost mixture of poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxalkylene polyamines such as those of the formulas:

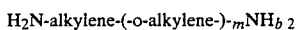   VII where m has a value of about 3 to 70 and preferably 10 to 35; and

   VIII where n has a value of about 1 to 40 with the proviso that the sum of all the n's is from about 3 to about 70 and preferably from about 6 to about 35, R is a polyvalent saturated hydrocarbon radical of up to ten carbon atoms, and a is a number from 3 to 6. The alkylene groups in either formula VII or VIII may be straight or branched chain containing about 2 to 7, and preferably about 2 to 4 carbon atoms.

The above polyoxyalkylene polyamines, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weight ranging from about 200 to 2,000. The polyoxyalkylene polyamines are commerically available and may be obtained, for example, from the Jefferson Chemical Company, Inc. under the trade name "Jeffamines D-230, D-400, D-1000, D-2000, T-403", etc.

The Aldehyde Material

The aldehyde material which can be employed in this invention is represented by the formula:

   IX in which R" is a hydrogen or an aliphatic hydrocarbon radical having from 1 to 4 carbon atoms. Examples of suitable aldehydes include formaldehyde, paraformaldehyde, acetaldehyde and the like.

The Lactone Material

Useful lactone compounds for the process of this invention include those lactones having at least five carbon atoms in the lactone ring, e.g. 5 to 9 carbon atoms. Such lactones are capable of undergoing ring opening polymerization by reaction with an amine group or a hydroxy group. The lactones may be substituted or unsubstituted and the subtituents, if any, may comprise, for example, $C_1$ to $C_{25}$ straight or branched chain alkyl; aryl, aralkyl, or cycloalkyl having 6 to 60 total carbon atoms; $C_1$ to $C_{12}$ alkoxy or other groups which would not interfere with the ring opening reaction and adduct formation. The preferred lactones have no more than two substituent groups, and the more preferred lactones are unsubstituted.

Non-limiting examples of the useful lactone include delta-valerolactone, methyl-delta-valerolactone, E-caprolactone, methyl-E-caprolactone, dimethyl-E-caprolactone, methoxy-E-caprolactone, cyclohexyl-E-caprolactone, methylbenzyl-E-caprolactone, caprylolactone, methyl-caprylolactone, and the like, with E-caprolactone being particularly preferred.

The ring opening polymerization of the lactone by reaction with a hydroxy group or an amine group-containing material may be carried out, with or without a catalyst, simply by heating a mixture of the lactone and the hydroxy group or amine group-containing material in a reaction vessel in the absence of a solvent at a temperature of from about 30° C. to about 200° C., more preferably at a temperature of about 75° C. to about 180° C., and most preferably about 90° to about 160° C., for a sufficient period of time to effect polymerization.

Optionally, a solvent for the monomer and/or polymer can be employed to control viscosity and/or reaction rates.

Preparation of the Lactone Polymers Dispersants

In one preferred aspect of this invention, the novel poly($C_5$–$C_9$ lactone) adducts are prepared by first reacting the long chain hydrocarbyl substituted dicarboxylic acid material with the N-hydroxyaryl amine material to form an intermediate N-(hydroxyaryl) hydrocarbyl dicarboxylic acid imide. In general, equimolar amounts of the hydrocarbyl substituted dicarboxylic acid material, such as polyisobutylene succinic anhydride, and of the N-hydroxyaryl amine, such as p-aminophenol, are dissolved in an inert solvent (i.e. a hydrocarbon solvent such as toluene, xylene, or isooctane) and reacted at a moderately elevated temperature up to the reflux temperature of the solvent used for sufficient time to complete the formation of the intermediate N-(hydroxyaryl)hydrocarbyl imide. Thereafter, the solvent is removed under vacuum at an elevated temperature, generally, at approximately 160° C. (1 mm).

Alternatively, the intermediate is prepared by combining equimolar amounts of the hydrocarbyl substituted dicarboxylic acid material and the N-(hydroxyaryl) amine and heating the resulting mixture at elevated temperature under a nitrogen purge in the absence of solvent. The resulting N-(hydroxyaryl) hydrocarbyl substituted imides can be illustrated by the succinimides of the formula:

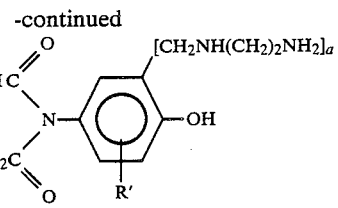

wherein R and R' are as defined above.

In the second step of this preferred aspect of the invention, the N-(hydroxyaryl)hydrocarbyl imide intermediate is reacted with a polyfunctional diamine together with an aldehyde in the Mannich base reaction. In general, the reactants are admixed and reacted at an elevated temperature until the reaction is complete. This reaction may be conducted in the presence of a solvent and in the presence of a quantity of mineral oil which is an effective solvent for the N-(hydroxyaryl)-hydrocarbyl imide intermediate and for the finished Mannich base. This second step can be illustrated by the Mannich base reaction between the above N-(hydroxyphenyl) hydrocarbyl succinimide intermediate, or formula X, paraformaldehyde and ethylene diamine in accordance with the following equation:

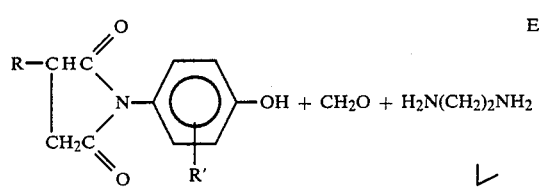

EQ. 5

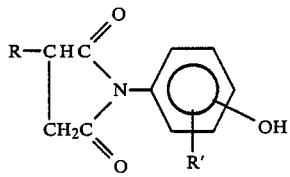

-continued wherein a is an integer of 1 or 2, and R and R' are as defined above.

In the final step of the poly($C_5$–$C_9$ lactone adduct formation, in accordance with this aspect of the invention, the intermediate formed by the Mannich base reaction is reacted with a lactone polymer using at least one residual amine functionality on the intermediate as the ring opening and polymerization initiator. This final step can be illustrated by the following equation wherein a $C_5$–$C_9$ lactone, such as E-caprolactone, is opened and polymerized by means of the amine functionality on the Mannich base intermediate:

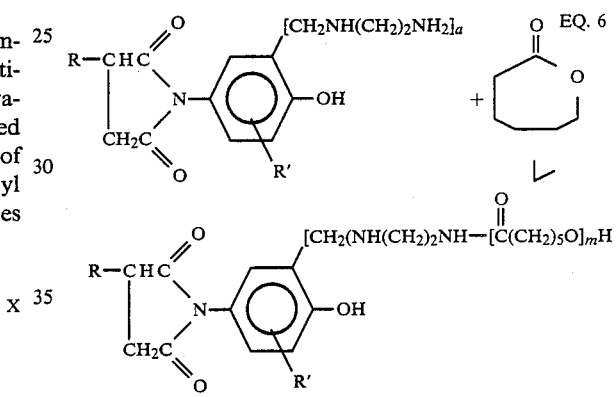

EQ. 6 where a=1, m-1-10 and R and R' are as defined above.

In another preferred aspect of the invention, the poly($C_5$–$C_9$ lactone) adducts are prepared by using the hydroxy functionality on the intermediate N-(hydroxyaryl) hydrocarbyl imide to open and polymerize te $C_5$–$C_9$ lactone and thereby form an intermediate, which intermediate is then admixed and reacted with the amine material and the aldehyde in the Mannich base reaction. The overall reaction scheme of this aspect of the invention can be illustrated as follows:

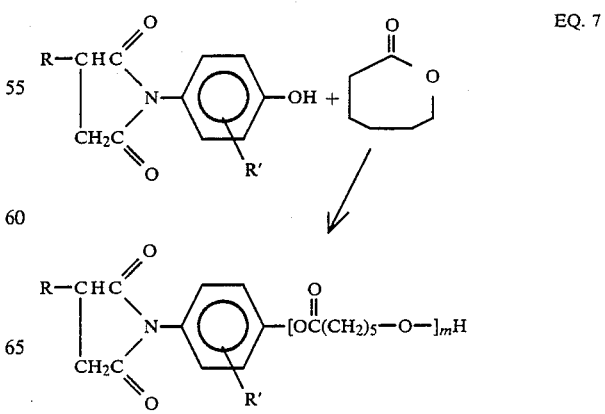

EQ. 7

-continued

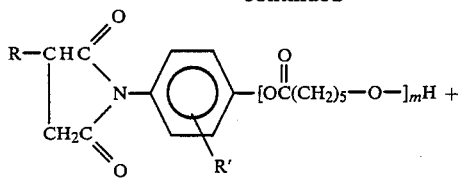
EQ. 8 is reacted with the hydrocarbyl substituted dicarboxylic acid material. The sequence of reactions performed in accordance with this aspect of the invention tends to result in the formation of various dispersant isomers because of the plurality of functional groups which are available for initiating the $C_5$–$C_9$ ring opening and polymerization. However, for the sake of illustration, this aspect of the invention may be represented by the following equations.

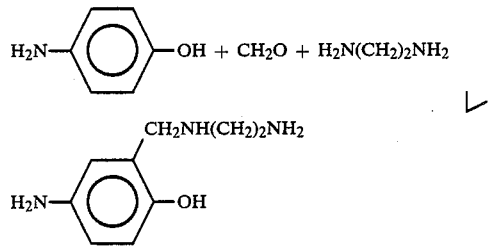
EQ. 9

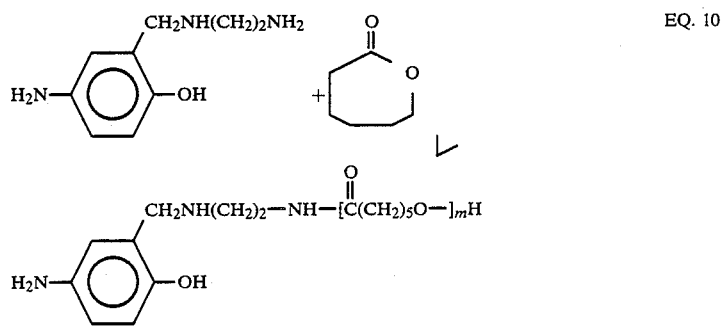
EQ. 10

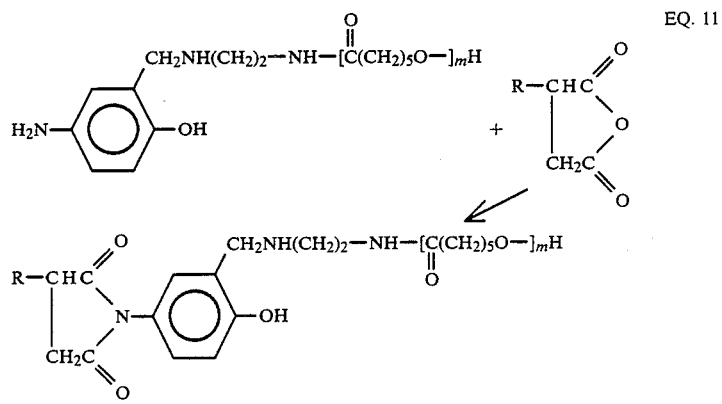
EQ. 11

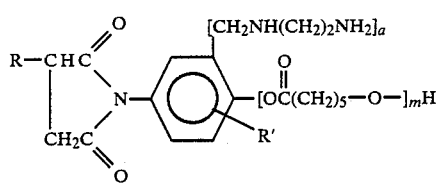

where m, a, R and R' are as previously defined.

In still other aspects of the invention, the order of reacting the various reactants is modified such that, for example, the N-hydroxyaryl amine is first admixed and reacted with the amine material and aldehyde in the Mannich base reaction. Thereafter, by the ring opening polymerization of the $C_5$–$C_9$ lactone is performed and the resulting poly ($C_5$–$C_9$ lactone) intermediate adduct where m and R are as previously defined.

It is also contemplated to admix and react the amine material with the $C_5$–$C_9$ lactone to form an intermediate poly($C_5$–$C_9$ lactone) adduct which is then reacted in sequence with the aldehyde, the N-hydroxyaryl amine and the hydrocarbyl substituted dicarboxylic acid material. Similarly, in other aspects of the invention the amine material is admixed and reacted with the aldehyde and the $C_5$–$C_9$ lactone to form a poly($C_5$–$C_9$ lactone) intermediate which is then reacted in sequence with the N-hydroxyaryl amine and the hydrocarbyl substituted dicarboxylic acid material. In still another alternative embodiment, the amine, $C_5$–$C_9$ lactone, N-hydroxyaryl amine and aldehyde are admixed and reacted, followed by reaction with the hydrocarbyl substituted dicarboxylic acid material to form the poly($C_5$–$C_9$ lactone) adduct dispersant.

In one preferred embodiment of the invention, the $C_5$–$C_9$ lactone is reacted with a polyisobutenyl succinimide which has been prepared by first reacting a polyisobutenyl succinic anhydride with an aminophenol to form an intermediate product, and then reacting the intermediate product with formaldehyde and a mixture of poly(ethyleneamines) in the Mannich base reaction as outlined above. This reaction can be depicted generally as in be the following equation when the succinimide has available primary amino functionality:

the initiator is such that very few primary amino groups are available, secondary amino groups will be converted to polylactone adducts. This preferance towards reaction with the primary amino groups results in an added benefit in those specific applications where the presence of primary amines is considered to be deleterious to performance (such as in diesel dispersancy). In those cases, the present invention provides a means for replacing the deleterious amine group with an amide function and a desirable hydroxyl group.

EQ. 12

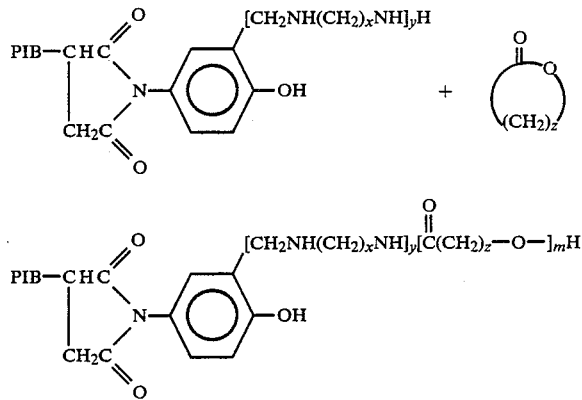

where x is a number from 1 to 4, y is a number from 1 to 10, preferably 3 to 7, m has an average value of from about 0.2 to about 100, preferably from 1 to about 20, z is from 4 to 8, PIB represents polyisobutylene having a number average molecular weight of from about 700 to about 10,000, preferably about 900 to about 3,000, and the ratio- (functionality) of succinic acid moieties is from about 0.7 to about 2.0 per equivalent, weight of polyisobutylene, and more preferably from about 1.00 to about 1.5 per equivalent weight of polyisobutylene.

Catalysts useful in the promotion of the above-identified reaction are selected from the group consisting of stannous octanoate, stannous hexanoate, stannous oxalate, tetrabutyl titanate, a variety of metal organic based catalysts, acid catalysts and amine catalysts, as described on page 266, and forward in a book chapter authored by R. D. Lundberg and E. F. Cox entitled, "Kinetics and Mechanisms of Polymerization: Ring Opening Polymerization"; edited by Frisch and Reegen, published by Marcel Dekker in 1969, wherein stannous octanoate is an especially preferred catalyst. The catalyst may be added to the reaction mixture at any effective concentration level. However, the catalyst generally is added at a concentration level of about 50 to about 10,000 parts of catalyst per one million parts by weight of total reaction mixture.

When initiating the polymerization of the lactone monomer under the conditions described herein, the lactone will react selectively first with primary amino groups present in the initiator molecule and form a polymer adduct containing the polylactone ester group and a terminal hydroxyl group. In the absence of a catalyst, any excess lactone monomer will either react with a secondary amino group present in the initiator molecule or with the hydroxyl group formed via the reaction of the lactone with the primary amino groups. In the presence of a catalyst, such as stannous octanoate, it is believed that the lactone preferably will react somewhat more readily with the terminal hydroxyl group than with a secondary amino group thus producing a polylactone ester adduct. If the stoichiometry of In the reactions shown above, the value of m or the average degree of polymerization (DP) of the lactone monomers may vary depending upon the intended application. At DP's of much greater than about 10, e.g., greater than about 50, the polylactone adducts can exhibit crystallinity; a characteristic which is undesirable in an oil soluble dispersant due to the consequent high viscosity or even solid, oil products which can be obtained However, at lower DP's, oil soluble adducts posessing low viscosity and desirable sludge and varnish inhibition characteristics are obtained. Accordingly, regardless of the identity of the lactone, the average degree of polymerization (DP) of the lactone modified, Mannich base dispersant additives of this invention should be between about 1 and about 100, more preferably between about 1 and about 50, and most preferably between about 0.2 and about 20.

Further aspects of the present invention reside in the formation of metal complexes and other post-treatment derivatives, e.g., borated derivatives, of the novel additives prepared in accordance with this invention. Suitable metal complexes may be formed in accordance with known techniques of employing a reactive metal ion species during or after the formation of the present $C_5$–$C_9$ lactone derived dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. No. 3,306,908 and Re. No. 26,433.

Post-treatment compositions include those formed by reacting the novel additives of the present invention with one or more post-treating reagents, usually selected from the group consisting of boron oxide, boron oxide hydrate, boron halides, boron esters, boron acids, sulfur, sulfur chlorides, phosphorous sulfides and oxides, carboxylic acid or anhydride acylating agents, epoxides and episulfides and acrylonitriles. The reaction of such posttreating agents with the novel additives of this invention is carried out using procedures known in the art. For example, boration may be accomplished in accordance with the teachings of U.S. Pat. No. 3,254,025 by treating the $C_5$-$C_9$ lactone derived additive compound with a boron oxide, halide, ester or acid. Treatment may be carried out by adding about 1-3 wt. % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

The Compositions

The lactone modified, Mannich base adducts of the present invention have been found to possess very good dispersant properties as measured herein in a wide variety of environments.

Accordingly, the lactone modified, Mannich base adducts are used by incorporation and dissolution into an oleaginous material such as fuels and lubricating oils.

When the dispersant adducts of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The lactone modified, Mannich base dispersants find their primary utility in lubricating oil compositions which employ a base oil in which the additives are dissolved or dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols, polyalphaolefins, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, molecular sieves, etc.

The lubricating oil base stock conveniently has a viscosity of typically about 2.5 to about 12, and preferably about 2.5 to about 9 cs. at 100° C.

Thus, the lactone modified, Mannich base additives of the present invention can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors oxidation inhibitors, friction modifiers, other dispersants, anti-foaming agents, anti-wear agents, pour point depressants and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound and interpolymers of styrene and acrylic esters.

Corrosion inhibitors, also known as anticorrosive agents, reduce the degradation of the metallic parts contacted by the lubricating oil composition. Illustrative of corrosion inhibitors are zinc dialkyldithiophosphate, phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration is evidenced by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydro-carbyl succinimide, S-carboxyalkylene hydrocarbyl succinamic acid and mixtures thereof; U.S. Pat. No. 3,879,306 which discloses N-(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853, disclosure of this patent also being herein incorporated by reference.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional anti-wear agents are zinc dialkyldithiophosphate, zinc diaryldithiosphate and magnesium sulfonate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 754,001, filed July 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Broad Wt. % a.i. | Preferred Wt. % a.i. |
| --- | --- | --- |
| Viscosity Modifier | .01–12 | .01–4 |
| Corrosion Inhibitor | 0.01–5 | .01–1.5 |
| Oxidation inhibitor | 0.01–1 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–20 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all percentages and parts are percentages and parts by weight and all molecular weights are number average molecular weights unless otherwise noted, and which include preferred embodiments of the invention.

EXAMPLE C1 (COMPARATIVE EXAMPLE)

Part A

A polyisobutenyl succinic anhydride (PIBSA) having an SA:PIB ratio of 1.23 succinic anhydride (SA) moieties per polyisobutylene (PIB) molecule of 1300 $\overline{M}_n$ was prepared by heating a mixture of 100 parts of polyisobutylene with 12.2 parts of maleic anhydride to a temperature of about 220° C. When the temperature reached 120° C., chlorine addition was begun and 10.5 parts of chlorine at a constant rate were added to the hot mixture for about 5 hours. The reaction mixture was then heat soaked at 220° C. for about 1.5 hours and then stripped with nitrogen for about 1 hour. The resulting polyisobutenyl succinic anhydride had an ASTM Saponification Number (SAP) of 97 which calculates to a succinic anhydride (SA) to polyisobutylene (PIB) ratio of 1.23 based upon the starting PIB as follows:

$$\text{SA:PIB ratio} = \frac{\text{SAP} \times M_n}{112200 - (96 \times \text{SAP})} = \frac{97 \times 1300}{112200 - (96 \times 97)} = 1.23$$

The PIBSA product was 90 wt. % active ingredient (a.i.), the remainder being primarily unreacted PIB The SA:PIB ratio of 1.23 is based upon the total PIB charged to the reactor as starting material, i.e., both the PIB which reacts and the PIB which remains unreacted. The PIBSA was then diluted with mineral oil solvent 150 neutral to produce a PIBSA of SAP 97 and 59 wt. % active ingredient.

Part B

To 1626 g (1.0 mole) of the PIBSA of Part A (diluted to 59% ai with S150N solvent neutral mineral oil having a viscosity of about 150 SSU at 100° C.) there was added 109 g (1.0 mole) of 4-aminophenol and 336 g of S150N lubricating oil. The mixture was stirred in a reaction flask and heated slowly to about 160° C. under a nitrogen blanket. The reaction mixture was then soaked for about 3 hours at 160° C. with light nitrogen stripping. The filtered N-(hydroxyphenyl) succinimide product analyzed for 0.68% nitrogen.

EXAMPLE C2 (COMPARATIVE EXAMPLE)

A mixture containing 2310 g (1.07 mole) of a polyisobutenyl succinic anhydride (SAP=52.2, ai=77.7 wt. %), 117.3 g (1.07 mole) of 4-aminophenol and 1389 g of S150N solvent neutral mineral oil was stirred and slowly heated to 160° C. while under nitrogen blanket. The reaction mixture was then heated at 160° C. for 3 hours and filtered. The resulting oil solution of N-(hydroxyphenyl) hydrocarbyl succinimide analyzed for 0.44 wt. % nitrogen.

EXAMPLE C3 (COMPARATIVE EXAMPLE)

About 200 g (0.097 mole) of the N-(hydroxyaryl) succinimide solution prepared in accordance with EXAMPLE 1, Part B was mixed with 18.8 g (0.097 mole) of a commercial grade of poly(ethyleneamine) which was a mixture of poly(ethyleneamines) averaging about 5 to 7 nitrogen per molecule, hereinafter referred to as PAM, 4.4 g (0.15 mole) of para-formaldehyde $(CH_2O)_x$ and 24.97 g of S150N and reacted at 80° C. for one hour under nitrogen atmosphere. The reaction mixture was then heated to 160° C. for one hour and stripped at analyzed for 3.02 wt % nitrogen.

EXAMPLE 4

About 200 g (0.097 mole) of the N-(hydroxylphenyl) hydrocarbyl succinimide prepared in accordance with EXAMPLE 1, Part B, 18.8 g (0.097 mole) of PAM, 4.4 g (0.15 mole) of $CH_2O$ and 27.18 g of S150N were mixed in a reaction flask and heated to 80° C. for one hour. The reaction mixture was then heated to 160° C. for one hour and nitrogen stripped for another hour. Then, 2.2 g of E-caprolactone (CL) and 0.05 g of stannous octanoate were added and the reaction mixture was heated at 160° C. for 3 hours while under nitrogen blanket. The reaction product was filtered and analyzed for 2.93 wt. % nitrogen.

EXAMPLE 5

The procedure of EXAMPLE 4 was repeated, except that 4.4 g of CL were added together with and 4.4 g of S150N. The reaction product analyzed for 2.92 wt. % nitrogen.

EXAMPLE 6

The procedure of EXAMPLE 4 was repeated, except that 6.6 g of CL and 6.6 g of S150N were added. The reaction product analyzed for 2.8 wt. % nitrogen.

EXAMPLE C7 (COMPARATIVE EXAMPLE)

The procedure of EXAMPLE 3 was followed except that 200 g (0.057 mole) of the succinimide of EXAMPLE 2 were mixed with 10.94 g (0.056) of PAM, 2.55 g of $CH_2O$ and 11.39 g of S150N. The oil solution analyzed for 1.91 wt. % nitrogen.

EXAMPLE 8

The product prepared in EXAMPLE 7 was mixed with 2.23 g CL and 2.23 g of S150N, and the mixture was heated at 160° C. for 3 hours. The filtered product analyzed for 1.87 wt. % nitrogen.

EXAMPLE 9

The procedure of EXAMPLE 8 was repeated, except that 4.47 g CL and 4.47 g of S150N were used. The product analyzed for 1.80 wt. % nitrogen.

EXAMPLE 10

The process of EXAMPLE 8 was repeated, except that 6.70 g of CL and 670 g of S150N were used. The product analyzed for 1.78 wt. % nitrogen.

Table 1, which follows, summarizes the characteristics of the dispersant materials prepared in accordance with EXAMPLES C1-10.

by draining and refilling taxicab crankcases at about 1,000–2,000 mile intervals.

The SIB Test is conducted in the following manner: The used crankcase oil is freed of sludge by centrifuging for one half hour at about 39,000 gravities (gs). The resulting clear bright red oil i then decanted from the insoluble sludge particles. However, the supernatant oil still contains oil-soluble sludge precursors which, under the conditions employed by this test, will tend to form additional oil-insoluble deposits of sludge. The sludge inhibiting properties of the additives being tested are determined by adding to portions of the used oil 0.5 wt. %, on an active basis, of the particular additive being tested. Ten grams of each oil sample being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the oil by decanting supernatant oil and then carefully washed with 15 ml. of pentane to remove all remaining oils from the sludge. The weight, in milligrams, of the new solid sludge that forms in the test is determined by drying the residue and weighing it. The results are reported as milligrams of sludge per ten grams of oil, thus measuring differences as small as one

TABLE 1
PROPERTIES OF DISPERSANT ADDUCTS

| DISPERSANT ADDUCT, EX. NO. | SA:PIB[1] | WT % N | PIB, $\overline{M}_n$[2] | SAP[3] | PIBSA/$H_2$NOOH[4] | % CL[5] | PIBSA/$CH_2O$[6] |
|---|---|---|---|---|---|---|---|
| C1 | 1.23 | 0.68 | 1300 | 97 | 1 | 0 | 0 |
| C2 | 1.10 | 0.44 | 2250 | 52.2 | 1 | 0 | 0 |
| C3 | 1.23 | 3.02 | 1300 | 97 | 1 | 0 | .65 |
| 4 | 1.23 | 2.93 | 1300 | 97 | 1 | 1 | .65 |
| 5 | 1.23 | 2.92 | 1300 | 97 | 1 | 2 | .65 |
| 6 | 1.23 | 2.81 | 1300 | 97 | 1 | 3 | .65 |
| C7 | 1.10 | 1.91 | 2250 | 52.2 | 1 | 0 | .67 |
| 8 | 1.10 | 1.87 | 2250 | 52.2 | 1 | 1 | .67 |
| 9 | 1.10 | 1.80 | 2250 | 52.2 | 1 | 2 | .67 |
| 10 | 1.10 | 1.78 | 2250 | 52.2 | 1 | 3 | .67 |

[1] = ratio of succinic anhydride moeities (SA) per polyisobutylene (PIB) molecule.
[2] = number average molecular weight of the PIB molecules
[3] = ASTM Saponification Number AM-I-769-81
[4] = ratio of polyisobutylene succinic anhydride (PIBSA) moieties to 4-aminophenol ($H_2$NOOH) moieties.
[5] = weight per cent of E -caprolactone (CL) moieties in dispersant adduct.
[6] = ratio of polyisobutenyl succinic anhydride (PIBSA) moieties to formaldehyde ($CH_2O$) moieties Sludge Inhibition and Varnish Inhibition Bench Tests Samples of the dispersant adducts prepared as set forth in EXAMPLES C1-10 and the resulting were subjected to a standard sludge inhibition bench test (SIB) and a standard varnish inhibition bench test (VIB). Samples of commercial PIBSA-PAM dispersants were also subjected to the SIB and VIB tests to provide a basis of comparison between the adducts of this invention and the corresponding prior art PIBSA-PAM and Mannich base derivative dispersants.

The SIB and VIB tests forecast the performance of a lubricant in a gasoline engine. These tests are described below The SIB Test employs a used crankcase mineral lubricating oil composition having an original viscosity of about 325 SSU at 37.8° C. that has been used in a taxicab driven generally for short trips only thereby causing a build up of a high concentration of sludge precursors. The oil used contains only a refined base mineral oil, a viscosity index improver, a pour point depressant and a zinc dialkyldithiophosphate anti-wear additive. The oil contains no sludge dispersants. Such used oil is acquired part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB Test, a test sample consisting of ten grams of lubricating oil containing 0.5 wt. %, on an active basis, of the additive being evaluated is used. The test oil is a commercial lubricating oil obtained from a taxi after about 2000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test samples and during the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine test which is described more fully hereinbelow.

Table 2, which follows, summarizes the compositions tested and the test results.

Part C

To the PIBSA-aminophenol reaction mixture obtained in Part B, there was added 9.5 g of tetraethylenepentamine (TEPA), and 3.6 g of $CH_2O$. The resulting mixture was heated at 80° C. for about 2 hours with nitrogen stripping to form a Mannich base dispersant.

Part D

To the Mannich base dispersant prepared in part C,

TABLE 2

SLUDGE INHIBITION AND VARNISH INHIBITION BENCH TESTS

| EXAMPLE NO | SAMPLE | SA:PIB | WT. % N | PIB $M_n$ | % CL | SIB[1] | VIB[1] | MANNICH BASE DERIVATIVE |
|---|---|---|---|---|---|---|---|---|
| 1 | | 1.23 | 0.68 | 1300 | 0 | 9.88 | 6 | NO |
| 2 | | 1.10 | 0.44 | 2250 | 0 | 8.94 | 5 | NO |
| 3 | | 1.23 | 3.02 | 1300 | 0 | 0.62 | 3 | YES |
| 4 | | 1.23 | 2.93 | 1300 | 1 | 1.19 | 3 | YES |
| 5 | | 1.23 | 2.92 | 1300 | 2 | 1.13 | 3 | YES |
| 6 | | 1.23 | 2.81 | 1300 | 3 | 0.02 | 3½ | YES |
| 7 | | 1.10 | 1.91 | 2250 | 0 | 3.50 | 4 | YES |
| 8 | | 1.10 | 1.87 | 2250 | 1 | 2.56 | 4 | YES |
| 9 | | 1.10 | 1.80 | 2250 | 2 | 3.06 | 3 | YES |
| 10 | | 1.10 | 1.78 | 2250 | 3 | 2.50 | 3 | YES |
| PIBSA-PAM (COMPARATIVE) | | | | | 0 | 3.19 | 5 | YES |
| PIBSA-PAM (COMPARATIVE) | | | | | 0 | 4.00 | 7 | YES |

[1] = mg sludge per 10 mg of sludge (rated on basis of 1 to 10, 1 being the best rating).
[2] = varnish rating visual (rated 1 to 11, 1 being the best rating).

The data in Table 2 shows that the VIB and SIB values of the various polycaprolactone modified Mannich base adducts are generally improved over the controls with increasing caprolactone content. In all practical systems the values obtained using the polycaprolactone modified Mannich base adducts of this invention are within acceptable limits.

EXAMPLE 11

Part A

The procedure of Example C1, Part A, was repeated, except that the PIB had a number average molecular weight ($\overline{M}_n$) of 2250. The resulting PIBSA had a SAP of 52.4 and an SA:PIB ratio of 1.10 and 78.9 wt. % a.i.

Part B

To 214.5 g. of the PIBSA of Part A, there was added 10.9 g of 4-aminophenol and 134 g. of S150N mineral oil. The mixture was stirred in a reaction flask and heated slowly to about 160° C. under a nitrogen blanket. The reaction mixture was then heated for about hours at 160° C. with nitrogen stripping.

there was added 4 g of CL and 0.1 g of stannous octanoate as a catalyst. The reaction mixture was heated for about 2 hours at 160° C. The resulting polycaprolactone modified Mannich base dispersant was nitrogen stripped for about ½ hour and filtered, and subjected to the standard SIB and VIB tests. The test results are shown in Table 3.

EXAMPLE 12

To 223 g of a PIBSA-aminophenol adduct, which was prepared in a manner similar to that described in EXAMPLE 11, Part B, there were added 4.0 g of CL, 0.1 g of SnOct$_2$ and 134 g of S150N mineral oil. The mixture was then heated at 160° C. for about 1 hour.

TABLE 3

| EXAMPLE NO. | PIBSA g | H$_2$NφOH g | TEPA g | CH$_2$O g | CL g | S150N g | SnOct$_2$[1] g | HAZE[2] | % N | VISCOSITY CST[3] @ 100° C. | SIB | VIB |
|---|---|---|---|---|---|---|---|---|---|---|---|---|
| 11 | 214.5 | 10.9 | 9.5 | 3.6 | 4 | 134 | 0.1 | 4.3 | 1.23 | 1306 | 0.99 | 4 |
| 12 | 214.5 | 10.9 | 9.5 | 3.6 | 4 | 134 | 0.1 | 200 | 1.04 | 149 | 2.73 | 4 |
| 13 | 214.5 | 10.9 | 9.5 | 3.6 | 4 | 134 | 0.1 | 88 | 1.09 | 591 | 2.15 | 4 |
| 14 | 214.5 | 10.9 | 9.5 | 3.6 | 4 | 134 | 0.1 | 7 | 1.10 | 1219 | 1.82 | 4 |
| 15 | 214.5 | 10.9 | 9.5 | 3.6 | 4 | 134 | 0.1 | 40 | 1.06 | 1199 | 1.32 | 4 |
| 16 | 214.5 | 10.9 | 9.5 | 3.6 | 4 | 134 | 0.1 | 139 | 1.13 | 995 | 2.23 | 5 |
| 17 | 214.5 | 10.9 | 9.5 | 3.6 | 4 | 134 | 0.1 | 74 | 1.07 | 857 | 1.90 | 4 |
| 18 (control) | 214.5 | 10.9 | 9.5 | 3.6 | — | 134 | — | 5.5 | 1.20 | 1049 | 5.26 | 3–4 |

[1] = stannous octoanate catalyst
[2] = nephelometer reading
[3] = centistokes
[4] = tetraethylene pentamine To the resulting solution there was added 9.5 g of TEPA and 3.6 g of $CH_2O$. The mixture wa then heated at 80° C. for 1 hour, at 130° C. for 1 hour, and at 160° C. for 2 hours. The resulting solution was nitrogen stripped, filtered and subjected to the standard SIB and VIB tests. The results of these test are shown in Table 3.

EXAMPLE 13

A TEPA-polycaprolactone adduct was prepared by heating a mixture of 9.5 g of TEPA, 4.0 g of CL, 0.1 g of SnOct$_2$ and 134 g of S150N mineral oil at 150° C. for 1 hour. The resulting solution was cooled and mixed with 3.6 g of CH$_2$O and 223 g of a PIBSA aminophenol prepared in accordance with the procedure of EXAMPLE 11, Part B. The reaction mixture was heated at 80° C. for 1 hour, at 130° C. for 1 hour, and 160 for 2 hours, and was then nitrogen stripped, filtered, and subjected to the standard SIB and VIB tests. The results of these tests are summarized in Table 3.

EXAMPLE 14

10.9 g of 4-aminophenol, 9.5 g of TEPA, 3.6 g of CH$_2$O and 134 g of S150N mineral oil were added to a reaction flask and at 80° C. for 1 hour. Thereafter, 4 g. of CL and 0.1 g of SnOct$_2$ were added to the flask and heating was continued for 1 hour at 160° C. 214.5 g of PIBSA, which was prepared in a manner similar to that set forth in EXAMPLE 11, Part A, was added to the reaction flask and the admixture was heated at 160° C. for 2 hours. The resulting polycaprolactone modified Mannich base dispersant solution was then filtered and subjected to the standard SIB and VIB tests. The results of these tests ar summarized in Table 3.

EXAMPLE 15

9.5 g of TEPA, 4.0 g of CL, 0.1 g of SnOct$_2$ and 134 g of S150N mineral oil were admixed and heated at 160° C. for 1 hour. The reaction mass was then cooled. 3.6 g of CH$_2$O, 10.9 g of 4-aminophenol and 100 g of toluene were then added to the reaction mass and the resulting admixture was heated at 80° C. for 1 hour. 214.5 g of the PIBSA prepared in accordance with EXAMPLE 11, Part A, were then added to the reaction mixture and the mixture was heated at 160° C. for 2 hours and filtered. The resulting polycapro-lactone modified Mannich base dispersant was subjected to the standard SIB and VIB tests. The results of these tests are summarized in Table 3.

EXAMPLE 16

9.5 g of TEPA, 4.0 g of CL, 0.1 g of SnOct$_2$ and 134 g of S150N mineral oil were mixed in a reaction flask and heated at 80° C. for 1 hour. Next, 10.9 g of 4-aminophenol and 100 g of toluene were added and the resulting mixture was heated for an additional hour at 80° C. Finally, 214.5 g. of the PIBSA prepared in accordance with EXAMPLE 11, Part A, was added and the mixture was heated at 130° C. for 1 hour and then at 160° C. for 2 hours to complete the formation of a polycaprolactone modified Mannich base dispersant. The dispersant was subjected to the standard SIB and VIB tests. The results of these tests are summarized in Table 3.

EXAMPLE 17

10.9 g of 4-aminophenol, 4.0 g of CL, 0.1 g of SnOct$_2$, 9.5 g of TEPA, 3.6 g of CH$_2$O and 134 g of S150N mineral oil were admixed and heated at 80° C. for 1 hour. 214.5 g of the PIBSA prepared in accordance with EXAMPLE 11, Part A, was then added to the reaction mass and heating was continued for 2 hours at 160° C. The resulting dispersant solution was then filtered and subjected to the standard SIB and VIB tests. The results of these tests are summarized in Table 3.

EXAMPLE 18

The procedure of EXAMPLE 11 was repeated, except that the Mannich base dispersant was not reacted with CL. The characteristics of the Mannich base dispersant (control) are also set forth in Table 3.

EXAMPLE 19

About 200 g of the product of Example 4 was mixed with about 4.1 g of boric acid and heated to 163° C. while stirring and nitrogen sparging. The mixture was kept at 163° C. to 2 hours, sparged with nitrogen for one half hour, and filtered. The resulting product analyzed for 0.36% boron.

EXAMPLE 20

About 200 g of the material prepared in accordance with Example 5 was mixed with 2.75 g of boric acid. The mixture was heated to 163° C. and stirred over a period of two hours. The reaction mixture was heated at 163° C. for another 2 hours while sparging with nitrogen. Filtered and collected product analyzed for 0.90% N and 0.24% Boron.

As used in this specification and claims, the terms "dicarboxylic acid material" and "dicarboxylic acid producing material" are used synonomously and are meant to describe dicarboxylic acids, anhydrides, esters, etc. Non-limiting examples of such materials include fumaric acid, itaconic acid, maleic acid, maleic anhydride, succinic acid, succinic anhydride, chloromaleic acid, dimethyl fumarate, chloromaleic anhydride, etc.

As will be evident to those skilled in the art, various modifications on this invention can be made or followed, in light of the foregoing disclosure and illustrative examples, tables and discussion, without departing from the spirit and scope of the disclosure or from the scope of the invention as set forth in the following claims.

What is claimed is:

1. A post-treated poly(C$_5$–C$_9$ lactone) modified Mannich base hydrocarbyl substituted C$_4$–C$_{10}$ dicarboxylic acid producing material useful as an oil additive and formed by (a) reacting a C$_5$–C$_9$ lactone, an amine, an aldehyde, an N-hydroxyaryl amine and a hydrocarbyl substituted C$_4$–C$_{10}$ dicarboxylic acid producing material to form a poly(C$_5$–C$_9$ lactone) modified Mannich Base adduct, said hydrocarbyl substituted C$_4$–C$_{10}$ dicarboxylic acid producing material being formed by reacting an olefin polymer of one or more C$_2$–C$_{10}$ monoolefins having a number average molecular weight of about 700 to about 10,000 and a C$_4$–C$_{10}$ monounsaturated dicarboxylic acid material, wherein there is an average of from 0.7 to about 2.0 dicarboxylic producing moieties per molecule of said olefin polymer used in the reaction, and said poly (C$_5$–C$_9$ lactone) modified Mannich base adduct containing the unit

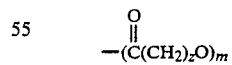

$$-(C(CH_2)_zO)_m$$

wherein m has an average value of from 0.2 to about 100, and z is 4 to 8, and (b) post-treating said adduct with a boron compound.

2. The post-treated poly (C$_5$–C$_9$ lactone) modified Mannich base adduct material according to claim 1, wherein said adduct has been prepared by first reacting said N-hydroxyaryl amine with said hydrocarbyl substituted dicarboxylic acid producing material to form an N-hydroxyaryl hydrocarbyl substituted imide, thereafter admixing said imide with said amine and said aldehyde and subjecting the admixture to a Mannich base reaction to form an intermediate adduct having an amino functional group capable of initiating lactone open ring polymerization, and then reacting said lactone with said intermediate adduct.

3. The post-treated poly (C₅–C₉ lactone) modified Mannich base adduct material according to claim 1, wherein said adduct has been prepared by first reacting said N-hydroxyaryl amine with said hydrocarbyl substituted dicarboxylic acid producing material to form an N-hydroxyaryl hydrocarbyl substituted imide having a functional group capable of initiating lactone ring open polymerization, thereafter reacting said imide with said lactone to form an intermediate adduct, and then admixing said intermediate adduct with said amine and said aldehyde and subjecting the admixture to a Mannich base reaction.

4. The post-treated poly (C₅–C₉ lactone) modified Mannich base adduct material according to claim 1, wherein said adduct has been prepared by first reacting said amine and said lactone to form a poly (C₅–C₉ lactone) intermediate adduct, and thereafter reacting with said intermediate adduct a mixture of said hydrocarbyl substituted dicarboxylic acid producing material, said aldehyde and said N-hydroxyaryl amine.

5. The post-treated poly (C₅–C₉ lactone) modified Mannich base adduct material according to claim 1, wherein said adduct has been prepared by first reacting said amine with said N-hydroxyarylamine and said aldehyde to form a first Mannich base intermediate containing a functional group capable of ring opening polymerization of said lactone, thereafter admixing and reacting said lactone with said first Mannich base intermediate to form a second Mannich base intermediate, and then admixing and reacting said hydrocarbyl substituted dicarboxylic acid producing material with said second Mannich base intermediate.

6. The post-treated poly (C₅–C₉ lactone) modified Mannich base adduct material according to claim 1, wherein said adduct as been prepared by first reacting said amine with said lactone to form a first poly(C₅–C₉ lactone) intermediate, followed by reacting said first intermediate with said aldehyde and said N-hydroxyaryl amine to form a second intermediate, and then by reacting said hydrocarbyl substituted dicarboxylic acid producing material with said second Mannich base intermediate.

7. The post-treated poly (C₅–C₉ lactone) modified Mannich base adduct material according to claim 1, wherein said adduct has been prepared by first reacting said amine with said aldehyde and said lactone to form a first poly(C₅–C₉ lactone) intermediate, followed by reacting said N-hydroxyaryl amine with said first intermediate to form a second intermediate, and then by reacting said hydrocarbyl substituted dicarboxylic acid producing material with said second intermediate.

8. The post-treated poly (C₅–C₉ lactone) modified Mannich base adduct material according to claim 1, wherein said adduct has been prepared by first reacting said amine with said lactone, said aldehyde and said N-hydroxyaryl amine to form an intermediate poly(C₅–C₉ lactone) adduct, followed by reacting said intermediate adduct with said hydrocarbyl substituted dicarboxylic acid producing material.

9. The post-treated poly (C₅–C₉ lactone) modified Mannich base adduct material according to claim 1, wherein said adduct has been prepared by first reacting said amine with said lactone to form a first poly(C₅–C₉ lactone) intermediate, and then reacting said intermediate with said aldehyde and a second intermediate formed by reacting said N-hydroxyaryl amine with said hydrocarbyl substituted dicarboxylic acid producing material.

10. The post-treated poly (C₅–C₉ lactone) modified Mannich base adduct material according to claim 1, wherein said C₅–C₉ lactone is E-caprolactone.

11. The post-treated adduct material according to claim 10, wherein said C₄–C₁₀ dicarboxylic acid producing material is maleic anhydride.

12. The post-treated adduct material according to claim 11, wherein said olefin polymer is polyisobutylene.

13. The post-treated adduct material according to claim 12, wherein said amine is selected from the group consisting of polyamines of about 2 to 60 total carbon atoms and about 2 to 12 nitrogen atoms in the molecule.

14. The post-treated adduct material according to claim 13, wherein said amine is an aliphatic saturated amine having the formula

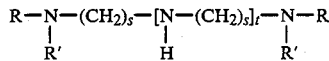

wherein R and R' independently are selected from the group consisting of hydrogen, C₁ to C₂₅ straight or branched chain alkyl radicals, C₁ to C₁₂ alkoxy C₂ to C₆ alkylene radicals, and C₁ to C₁₂ alkylamino C₂ to C₆ alkylene radicals; each s is the same or a different number of from 2 to 6; and t is a number of from 0 to 10, with the provision that when t=0, at least one of R or R' must be H such that there are at least two of either primary or secondary amino groups.

15. The post-treated adduct material of claim 14, wherein said amine is selected from the group consisting of 1, 2-diaminoethane; 1, 3-diaminopropane; 1, 4-diaminobutane; 1, 6-diaminohexane; diethylene triamine; triethylene tetramine; tetraethylene pentamine; 1, 2-propylene diamine; di-(1, 2-propylene)triamine; di-(1, 3-propylene) triamine; N, N-dimethyl-1, 3-diaminopropane; N, N-di-(2-aminoethyl) ethylene diamine; and N-dodecyl-1, 3-propane diamine.

16. The post-treated adduct material according to claim 13, wherein said amine is selected from the group consisting of alicyclic diamines, imidazolines, morpholines, and N-aminoalkyl piperazines of the general formula:

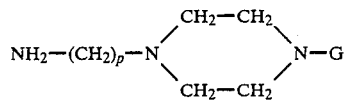

wherein G is independently selected from the group consisting of hydrogen and omega-(nontertiary)aminoalkylene radicals of from 1 to 3 carbon atoms, and p is a number of from 1 to 4.

17. The post-treated adduct material according to claim 13, wherein said amine is a mixture of poly (ethyleneamines) averaging about 5 to about 7 nitrogen atoms per molecule 18. The post-treated adduct material of claim 13, wherein said amine is a polyoxyalkylene polyamine having the formula:

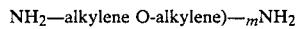

where m has a value of about 3 to 70; or

R—[alkylene—(O-alkylene)—$_n$NH$_2$]$_a$ where n has a value of about 1 to 40 with the provision that the sum of all the n's is from about 3 to about 70, R is a substituted saturated hydrocarbon radical of up to ten carbon atoms, wherein the number of substituents on the R group is represented by the value of "a", which is a number from 3 to 6.

19. The post-treated adduct material of claim 1, wherein said adduct has been post-treated with a boron compound comprising a member selected from the group consisting of borates of iron, cobalt, nickel, copper, chromium, manganese, molybdenum, tungsten, ruthenium, palladium, platinum, cadmium, lead, silver, mercury and antimony.

20. The post-treated adduct material of claim 1, wherein said adduct is post-treated with a boron oxide, boron oxide hydrate, boron halide, boron ester or boron acid.

21. The post-treated adduct material according to claim 1, wherein the average value of m is 1 to about 20.

22. The post-treated adduct material according to claim 13, wherein the average value of m is 1 to about 20.

23. The post-treated adduct material according to claim 14, wherein the average value of m is 1 to about 20.

24. The post-treated adduct material according to claim 12, wherein there are about 1.0 to 1.5 succinic anhydride units per polyisobutylene moiety used in said reaction.

25. The post-treated adduct material according to claim 12 which has been post-treated with a boron compound, selected from the group consisting of boron oxide, boron oxide hydrate, boron halide, boron ester or boron acid.

26. The post-treated adduct material according to claim 23, wherein there are about 1.0 to 1.5 succinic anhydride units per polyisobutylene moiety used in said reaction.

27. The post-treated adduct material according to claim 13, wherein there are about 1.0 to 1.5 succinic anhydride units per polyisobutylene moiety used in said reaction 28. An oleaginous composition comprising a lubricating oil, and a poly (C$_5$–C$_9$ lactone) modified Mannich base adduct material prepared by (a) reacting an amine, a hydrocarbyl substituted C$_4$–C$_{10}$ dicarboxylic acid producing material, an aldehyde, an N-hydroxy-arylamine and a C$_5$–C$_9$ lactone, said hydrocarbyl substituted C$_4$–C$_{10}$ dicarboxylic acid producing material being formed by reacting an olefin polymer of a C$_2$–C$_{10}$ monoolefin of 700 to about 10,000 $\overline{M}_n$ with a C$_4$–C$_{10}$ monounsaturated dicarboxylic acid material, wherein there is an average of from about 0.7 to about 2.0 dicarboxylic acid producing moieties per molecule of said olefin polymer used in the reaction, and wherein said poly (C$_5$–C$_9$ lactone) modified Mannich base adduct material contains the unit $$-[\overset{O}{\overset{\|}{C}}(CH_2)_zO]_m-,$$

where m is a number having an average value of from 0.2 to about 100, and z is 4 to 8, and (b) post-treating said adduct material with a boron compound.

29. An oleaginous composition according to claim 28, wherein said poly(C$_5$–C$_9$ lactone) modified Mannich base adduct material has been prepared by first reacting said N-hydroxyaryl amine with said hydrocarbyl substituted dicarboxylic acid producing material to form an N-hydroxyaryl hydrocarbyl substituted imide thereafter admixing said imide with said amine and said aldehyde and subjecting the admixture to a Mannich base reaction to form an intermediate adduct having an amino functional group capable of initiating lactone open ring polymerization, and then reacting said lactone with said intermediate adduct.

30. An oleaginous composition according to claim 28, wherein said poly(C$_5$–C$_9$ lactone) modified Mannich base adduct material has been prepared by first reacting said N-hydroxyaryl amine with said hydrocarbyl substituted dicarboxylic acid producing material to form an N-hydroxyaryl hydrocarbyl substituted imide having a functional group capable of initiating lactone ring open polymerization, thereafter reacting said imide with said lactone to form an intermediate adduct, and then admixing said intermediate adduct with said amine and said aldehyde and subjecting the admixture to a Mannich base reaction.

31. An oleaginous composition according to claim 28, wherein said poly(C$_5$–C$_9$ lactone) modified Mannich base adduct material has been prepared by first reacting said amine and said lactone to form a poly (C$_5$–C$_9$ lactone) intermediate adduct, and thereafter reacting with said intermediate adduct a mixture of said hydrocarbyl substituted dicarboxylic acid producing material, said aldehyde and said N-hydroxyaryl amine.

32. An oleaginous composition according to claim 28, wherein said poly(C$_5$–C$_9$ lactone) modified Mannich base adduct material has been prepared by first reacting said amine with said N-hydroxyarylamine and said aldehyde to form a first Mannich base intermediate containing a functional group capable of ring opening polymerization of said lactone, thereafter admixing and reacting said lactone with said first Mannich base intermediate to form a second Mannich base intermediate, and then admixing and reacting said hydrocarbyl substituted dicarboxylic acid producing material with said second Mannich base intermediate.

33. An oleaginous composition according to claim 28, wherein said poly(C$_5$–C$_9$ lactone) modified Mannich base adduct material has been prepared by first reacting said amine with said lactone to form a first poly(C$_5$–C$_9$ lactone) intermediate, followed by reacting said first intermediate with said aldehyde and said N-hydroxyaryl amine to form a second intermediate, and then by reacting said hydrocarbyl substituted dicarboxylic acid producing material with said second intermediate.

34. An oleaginous composition according to claim 28, wherein said poly(C$_5$–C$_9$ lactone) modified Mannich base adduct material has been prepared by first reacting said amine with said aldehyde and said lactone to form a first poly(C$_5$–C$_9$ lactone) intermediate, followed by reacting said N-hydroxyaryl amine with said first intermediate to form a second intermediate, and then by reacting said hydrocarbyl substituted dicarboxylic acid producing material with said second intermediate.

35. An oleaginous composition according to claim 28, wherein said poly(C$_5$–C$_9$ lactone) modified Mannich base adduct material has been prepared by first reacting amine with said lactone, said aldehyde and said N-hydroxyaryl amine to form an intermediate poly($C_5$-$C_9$ lactone) adduct, followed by reacting said intermediate adduct with said hydrocarbyl substituted dicarboxylic acid producing material.

36. An olegenous composition according to claim 28, wherein said poly($C_5$-$C_9$) modified Mannich base adduct material has been prepared by first reacting said amine with said lactone to form a first poly($C_5$-$C_9$ lactone) intermediate, and then reacting said intermediate with said aldehyde and a second intermediate formed by reacting said N-hydroxyaryl amine with said hydrocarbyl substituted dicarboxylic acid producing material.

37. The oleaginous composition according to claim 28, wherein said $C_5$-$C_9$ lactone monomer is E-caprolactone.

38. The oleaginous composition according to claim 28, wherein said boron compound comprises a member selected from the group consisting of borates of iron, cobalt, nickel, copper, chromium, manganese, molybdenum, tungsten, ruthenium, palladium, platinum, cadium, lead, silver, mercury and antimony.

39. The oleaginous composition according to claim 38, wherein the post-treatment is conducted with a boron oxide, boron oxide hydrate, boron halide, boron ester and boron acid.

40. A lubricating oil composition comprising lubricating oil and about 0.01 to 15 wt. % of the post-treated poly ($C_5$-$C_9$) lactone modified Mannich base adduct material of claim 1.

41. A lubricating oil comprising a major amount of lubricating oil and about 0.1 to 10 wt. % of the post-treated poly ($C_5$-$C_9$) lactone modified Mannich base adduct material of claim 1.

42. A lubricating oil comprising a major amount of lubricating oil and about 0.1 to 10 wt. % of the post-treated poly ($C_5$-$C_9$) lactone modified Mannich base adduct material according to claim 10.

43. A lubricating oil comprising a major amount of lubricating oil and about 0.1 to 10 wt. % of the post-treated poly ($C_5$-$C_9$) lactone modified Mannich base adduct material according to claim 12.

44. A lubricating oil comprising a major amount of lubricating oil and about 0.1 to 10 wt. % of the post-treated poly ($C_5$-$C_9$) lactone modified Mannich base adduct material according to claim 19.

45. A lubricating oil comprising a major amount of lubricating oil and about 0.1 to 10 wt. % of the post-treated poly ($C_5$-$C_9$) lactone modified Mannich base adduct material according to claim 24.

46. A lubricating oil comprising a major amount of lubricating oil and about 0.1 to 10 wt. % of the post-treated poly ($C_5$-$C_9$ lactone modified Mannich base adduct material according to claim 17.

47. An Oil composition containing lubricating oil and 0.01 to 15 wt. %, based on the weight of the total composition, of a post-treated poly ($C_5$-$C_9$ lactone) modified Mannich base adduct material according to claim 1.

48. An oil composition containing lubricating oil and 0.1 to 15 wt. %, based on the weight of the total composition, of a post-treated poly ($C_5$-$C_9$ lactone) modified Mannich base adduct material according to claim 10.

49. An oil composition containing lubricating oil and 0.01 to 15 wt. %, based on the weight of the total composition, of a post-treated poly ($C_5$-$C_9$ lactone) modified Mannich base adduct material according to claim 12.

50. An oil composition containing lubricating oil and 0.01 to 15 wt. %, based on the weight of the total composition, of a post-treated poly ($C_5$-$C_9$ lactone) modified Mannich base adduct material according to claim 19.

51. An oil composition containing lubricating oil and 0.01 to 15 wt. %, based on the weight of the total composition, of a post-treated poly ($C_5$-$C_9$ lactone) modified Mannich base adduct material according to claim 24.

52. An oil composition containing lubricating oil and 0.01 to 15 wt. %, based on the weight of the total composition, of a post-treated poly ($C_5$-$C_9$ lactone) modified Mannich base adduct material according to claim 17.

53. A post-treated oil soluble dispersant useful as an oil additive, comprising the product of a reaction of:
(I) a hydrocarbyl substituted $C_4$ to $C_{10}$ monounsaturated dicarboxylic acid producing material formed by reacting olefin polymer of $C_2$ to $C_{10}$ monoolefin having a molecular weight of about 700 to 5,000 and a $C_4$ to $C_{10}$ monounsaturated acid material, wherein there are 0.7 to 2.0 dicarboxylic acid producing moieties per molecule of said olefin polymer in the reaction mixture;
(II) a $C_5$-$C_9$ lactone, wherein there are, on the average, 0.2 to about 100 $C_5$-$C_9$ lactone derived moieties per moiety of said hydrocarbyl substituted di-carboxylic acid material used in the reaction;
(III) an aldehyde having the formula

R"CHO, where R" is hydrogen or an aliphatic hydrocarbon radical having from 1 to 4 carbon atoms;
(IV) an amine; and
(V) an N-hydroxyarylamine having the formula $H_2N$—Ar—OH, where Ar represents

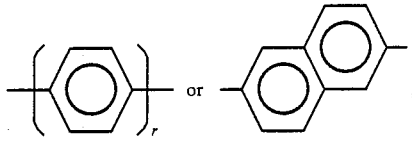

and r is an integer of 1 or 2, wherein the Ar group may be substituted with hydrocarbyl groups or with 1 to 3 halogen radicals, said reaction product having been post-treated with a boron compound.

54. The post-treated oil soluble dispersant according to claim 53, wherein said reactive product has been prepared by first reacting said N-hydroxyaryl amine with said hydrocarbyl substituted dicarboxylic acid producing material to form an N-hydroxyaryl hydrocarbyl substituted imide, thereafter admixing said imide with said amine and said aldehyde and subjecting the admixture to a Mannich base reaction to form an intermediate adduct having an amino functional group capable of initiating lactone open ring polymerization, and then reacting said lactone with said intermediate adduct.

55. The post-treated oil soluble dispersant according to claim 53, wherein said reactive product has been prepared by first reacting said N-hydroxyaryl amine with said hydrocarbyl substituted dicarboxylic acid producing material to form an N-hydroxyaryl hydrocarbyl substituted imide having a functional group capable of initiating lactone ring open polymerization, thereafter reacting said imide with said lactone to form an intermediate adduct, and then admixing said intermediate adduct with said amine and said aldehyde and subjecting the admixture to a Mannich base reaction.

56. The post-treated oil soluble dispersant according to claim 53, wherein said reactive product has been prepared by first reacting said amine and said lactone to form a poly ($C_5$-$C_9$ lactone) intermediate adduct, and thereafter reacting with said intermediate adduct a mixture of said hydrocarbyl substituted dicarboxylic acid producing material, said aldehyde and said N-hydroxyaryl amine.

57. The post-treated oil soluble dispersant according to claim 53, wherein said reactive product has been prepared by first reacting said amine with said N-hydroxyarylamine and said aldehyde to form a first Mannich base intermediate containing a functional group capable of ring opening polymerization of said lactone, thereafter admixing and reacting said lactone with said first Mannich base intermediate to form a second Mannich base intermediate, and then admixing and reacting said hydrocarbyl substituted dicarboxylic acid producing material with said second Mannich base intermediate.

58. The post-treated oil soluble dispersant according to claim 53, wherein said reactive product has been prepared by first reacting said amine with said lactone to form a first poly($C_5$-$C_9$ lactone) intermediate, followed by reacting said first intermediate with said aldehyde and said N-hydroxyaryl amine to form a second intermediate, and then by reacting said hydrocarbyl substituted dicarboxylic acid producing material with said second intermediate.

59. The post-treated oil soluble dispersant according to claim 53, wherein said reactive product has been prepared by first reacting said amine with said aldehyde and said lactone to form a first poly($C_5$-$C_9$ lactone) intermediate, followed by reacting said N-hydroxyaryl amine with said first intermediate to form a second intermediate, and then by reacting said hydrocarbyl substituted dicarboxylic acid producing material with said second intermediate.

60. The post-treated oil soluble dispersant according to claim 53, wherein said reactive product has been prepared by reacting said amine with said lactone, said aldehyde and said N-hydroxyaryl amine to form an intermediate poly($C_5$-$C_9$ lactone) adduct, followed by reacting said intermediate with said hydrocarbyl substituted dicarboxylic acid producing material.

61. The post-treated oil soluble dispersant according to claim 53, wherein said reactive product has been prepared by first reacting said amine with said lactone to form a first poly($C_5$-$C_9$ lactone) intermediate, and then reacting said intermediate with said aldehyde and a second intermediate formed by reacting said N-hydroxyaryl amine with said hydrocarbyl substituted dicarboxylic acid producing material.

62. The post-treated oil soluble dispersant according to claim 53, wherein said $C_5$-$C_9$ lactone is E-caprolactone, and wherein said dispersant contains the unit

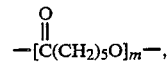

wherein m is from 1 to about 100.

63. The post-treated oil soluble dispersant according to claim 62, wherein said polyamine is selected from the group consisting of polyamines of about 2 to 60 total carbon atoms and about 2 to 12 nitrogen atoms in the molecule.

64. The post-treated oil soluble dispersant according to claim 63, wherein m is 1 to 20, and wherein said polyamine is an aliphatic saturated amine having the general formula

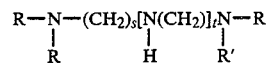

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the proviso that when t=0, at least one of R or R' must be H such that there are at least two of either primary or secondary amino groups.

65. The post-treated oil soluble dispersant according to claim 64, wherein said polyamine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene triamine; N,N-dimethyl-1,3-diaminopropane; N,N-di-(2-aminoethyl) ethylene diamine; and N-dodecyl-1,3-propane diamine.

66. The oil soluble dispersant of claim 63, wherein said amine is selected from the group consisting alicyclic diamines, imidazoles, morpholines, and N-aminoalkyl piperazines of the general formula:

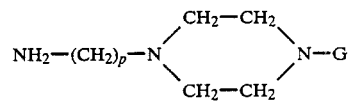

wherein G is independently selected from the group consisting of hydrogen and omega-(nontertiary)aminoalkylene radicals of from 1 to 3 carbon atoms, and p is a number of from 1 to 4.

67. The oil soluble dispersant according to claim 63, wherein said polyamine is a mixture of poly(ethyleneamines) averaging about 5 to about 7 nitrogen atoms per molecule.

68. The oil soluble dispersant according to claim 63, wherein said polyamine is a polyoxyalkylene polyamine having the formula:

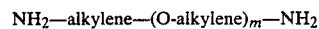

where m has a value of about 3 to 70; or

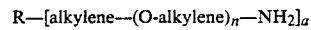

where n has a value of about 1 to 40 with the provision that the sum of all the n's is from about 3 to about 70, R is a substituted saturated hydrocarbon radical of up to ten carbon atoms, wherein the number of substituents on the R group is represented by the value of "a", which is a number from 3 to 6.

69. The post-treated oil soluble dispersant according to claim 53, wherein said reaction product has been post-treated with a boron compound comprising a member selected from the group consisting of borates of iron, cobalt, nickel, copper, chromium, manganese, molybdenum, tungsten, ruthenium, palladium, platinum, cadmium, lead, silver, mercury and antimony.

70. The post-treated oil soluble dispersant according to claim 53 wherein said reaction product is post-treated with a boron oxide, boron oxide hydrate, boron halide, boron ester or boron acid.

71. A post-treated oil soluble reaction product useful as an oil additive comprising an oil-soluble reaction product of:
(a) polymer consisting essentially of $C_2$ to $C_{10}$ monoolefin, said polymer being of 700 to 10,000 molecular weight and substituted with succinic moieties selected from the group consisting of acid, anhydride and ester groups, wherein there are about 0.7 to 2.0 molar proportions of succinic moieties per molar proportion of said polymer,
(b) amine containing 2 to 60 carbon atoms and 2 to 12 nitrogen groups, and
(c) $C_6$-$C_9$ lactone,
(d) N-hydroxyaryl amine having the formula $H_2N$—Ar—OH, wherein Ar represents

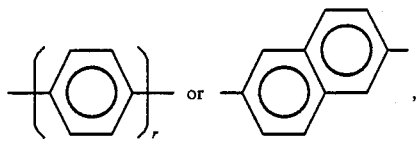

wherein the Ar group may be substituted with hydrocarbyl groups or with 1 to 3 halogen radicals, and r is an integer of 1 or 2, and
(e) aldehydes having the formula

RCHO, where R is hydrogen or an aliphatic hydrocarbon radical having 1 to 4 carbon atoms; wherein there are, on the average, about 0.2 to 100 molar proportions of (e) per molar proportion of said oil soluble reaction product, wherein said reaction product is post-treated with a boron compound.

72. The post-treated oil soluble reaction product of claim 71 wherein (a) is first reacted with (d) to form a first intermediate, wherein a mixture of (b) and (e) is then reacted with said first intermediate to form a second intermediate, and wherein (c) is then reacted with said second intermediate.

73. The post-treated oil soluble reaction product of claim 71 wherein (a) is first reacted with (d) to form a first intermediate, wherein (e) is then reacted with said first intermediate to form a second intermediate, and wherein a mixture of (b) and (e) are then reacted with said second intermediate.

74. The post-treated oil soluble reaction product of claim 71 wherein (b) is reacted with (c) to form a first intermediate, wherein (a) is reacted with (d) to form a second intermediate, and wherein said first intermediate is then reacted with a mixture of said second intermediate and (e).

75. The post-treated oil soluble reaction product of claim 71 wherein (d) is reacted with (b) and (e) to form a first intermediate, wherein (c) is reacted with said first intermediate to form a second intermediate, and wherein (a) is reacted with said second intermediate.

76. The post-treated oil soluble reaction product of claim 71 wherein in (b) is first reacted with (c) to form an intermediate, and wherein said intermediate is then reacted with a mixture of (a), (d) and (e).

77. The post-treated oil soluble reaction product of claim 71 wherein (b) is first reacted with (c) to form a first intermediate, wherein a mixture of (e) and (d) is reacted with said first intermediate to form a second intermediate, and wherein said second intermediate is reacted with (a).

78. The post-treated oil soluble reaction product of claim 71 wherein a mixture of (c), (b) and (e) is reacted to form a first intermediate, wherein (d) is reacted with said first intermediate to form a second intermediate, and wherein (a) is then reacted with said second intermediate.

79. The post-treated oil soluble reaction product of claim 71 wherein a mixture of (b), (c), (d) and (e) is first reacted to form an intermediate which is then reacted with (a).

80. The post-treated oil soluble reaction product according to claim 71, wherein (b) is an aliphatic saturated amine having the general formula

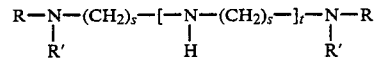

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provision that when t=0, at least one of R or R' must be H such that there are at least two of either primary or secondary amino groups.

81. The post-treated oil soluble reaction product according to claim 80, wherein (b) is amine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene triamine; N,N-dimethyl-1,3-diaminopropane; N,N-di-(2-aminoethyl) ethylene diamine; and N-dodecyl-1,3-propane diamine.

82. The post-treated oil soluble reaction product according to claim 71, wherein (b) is a mixture of poly(ethyleneamines) averaging about 5 to about 7 nitrogen atoms per molecule.

83. The post-treated oil soluble reaction product according to claim 71, wherein (a) is polyisobutylene of about 700 to 3,000 molecular weight substituted with succinic anhydride moieties.

84. The post-treated oil soluble reaction product according to claim 80, wherein (c) is E-caprolactone and wherein there are about 1 to 20 molar proportions of (c) per molar proportion of said reaction product.

85. The post-treated oil soluble reaction product according to claim 84, wherein (a) is a polyisobutylene of about 900 to about 2,500 molecular weight substituted with succinic anhydride moieties.

86. The post-treated oil soluble reaction product according to claim 84, wherein (b) is an aliphatic saturated amine having the general formula

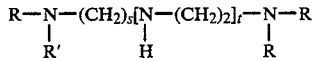

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provision that when t=0, at least one of R or R' is H such that there are at least two of either primary or secondary amino groups.

87. The post-treated oil soluble reaction product according to claim 86, wherein (b) is amine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene triamine; N,N-dimethyl-1,3-diaminopropane; N,N-di-(2-aminoethyl) ethylene diamine; and N-dodecyl-1,3-propane diamine.

88. The post-treated oil soluble reaction product according to claim 84, wherein (b) is a mixture of poly(ethyleneamines) averaging about 5 to about 7 nitrogen atoms per molecule.

89. The post-treated oil soluble reaction product according to claim 74 wherein said reaction product has been post-treated with boron compound comprising a member selected from the group consisting of borates of iron, cobalt, nickel, copper, chromium, manganese, molybdenum, tungsten, ruthenium, palladium, platinum, cadmium, lead, silver, mercury and antimony.

90. An oleaginous composition comprising lubricating oil containing the post-treated oil soluble additive of claim 71.

91. The oleaginous composition of claim 90, wherein said lactone is E-caprolactone and wherein there are, on the average, from about 1 to 20 molar proportions of lactone per molar proportion of said oil soluble additive.

92. The oleaginous composition according to claim 91, wherein said amine is an aliphatic saturated amine having the general formula

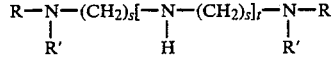

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provision that when t=0, at least one of R and R' is H such that there are at least two primary or secondary amino groups present in said polyamine.

93. The oleaginous composition according to claim 91, wherein said polyamine is a mixture of poly(ethyleneamines) averaging about 5 to about 7 nitrogen atoms per molecule.

94. The oleaginous composition according to claim 90, wherein said amine is an aliphatic saturated amine having the general formula

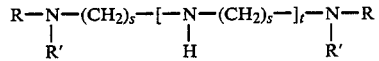

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when t=0, at least one of R and R' is H such that there are at least two primary or secondary amino groups present in said amine.

95. The oleaginous composition according to claim 90, wherein said amine is a mixture of poly(ethyleneamines) averaging about 5 to about 7 nitrogen atoms per molecule.

96. The lubricating oil composition according to claim 94, wherein (a) is polyisobutylene of about 700 to 3,000 molecular weight substituted with succinic anhydride moieties.

97. The lubricating oil composition according to claim 95, wherein (a) is polyisobutylene of about 700 to 3,000 molecular weight substituted with succinic anhydride moieties.

98. The lubricating oil composition according to claim 96, wherein said oil soluble reaction product has been post-treated with a boron compound comprising a member selected from the group consisting of borates of iron, cobalt, nickel, copper, chromium, manganese, molybdenum, tungsten, ruthenium, palladium, platinum, cadmium, lead, silver, mercury and antimony.

99. The lubricating oil composition according to claim 97, wherein said reaction product has been post-treated with a boron compound selected from the group consisting of boron oxide, boron oxide hydrate, boron halide, boron ester or boron acid.

100. A lubricating crankcase motor oil composition for automotive vehicles and trucks comprising a major amount of lubricating oil; from about 0.01 to 15 wt. % of the post-treated oil soluble reaction product of claim 71; and an effective amount of a viscosity modifier.

101. The composition according the claim 100, wherein said composition also contains an effective amount of an anti-wear agent.

102. A lubricating crankcase motor oil composition for automotive vehicles and trucks comprising a major amount of lubricating oil; from about 0.01 to 15 wt. % of the post-treated oil soluble reaction product of claim 72, and an effective amount of a viscosity modifier.

103. The composition according to claim 102, wherein said composition also contains an effective amount of an anti-wear agent.

104. An additive concentrate comprising about 20 to 80 wt. % lubricating oil and 20 to about 80 wt. % of a post-treated oil soluble reaction product which is a poly ($C_5$–$C_9$ lactone) modified Mannich base according to claim 71.

105. The additive concentrate according to claim 104, wherein said post-treated oil soluble reaction product has been prepared by first reacting said N-hydroxyaryl amine (d) with said polymer (a) to form a first intermediate, then reacting said first intermediate with a mixture of said amine (b) and said aldehyde (e) to form a second intermediate, and finally reacting said lactone (c) with said second intermediate.

106. The concentrate according to claim 104, which also contains an effective amount of a viscosity modifier.

107. The concentrate according to claim 106, which also contains an effective amount of an antiwear agent.

108. The concentrate according to claim 104 wherein said oil soluble reaction product has been post-treated with a boron compound comprising a member selected from the group consisting of borates of iron, cobalt, nickel, copper, chromium, manganese, molybdenum, tungsten, ruthenium, palladium, platinum, cadmium, lead, silver, mercury and antimony.

109. The concentrate according to claim 105, wherein said lactone is E-caprolactone, and wherein said post-treated oil soluble reaction product contains, on the average, from 1 to 20 caprolactone moieties per molecule of said monoolefin polymer.

110. An additive concentrate according to claim 109, which also contains an effective amount of a viscosity modifier.

111. An additive concentrate according to claim 110, which also contains an effective amount of a zinc dihydrocarbyl dithiophosphate.

112. An additive concentrate according to claim 111, wherein said oil soluble reaction product has been post-treated with a boron compound selected from the group consisting of boron oxide, boron oxide hydrate, boron halide, boron ester and boron acid.

* * * * *